(12) United States Patent
Morita et al.

(10) Patent No.: US 11,665,042 B2
(45) Date of Patent: May 30, 2023

(54) RECEIVING DEVICE

(71) Applicant: ANRITSU CORPORATION, Kanagawa (JP)

(72) Inventors: Atsuki Morita, Kanagawa (JP); Mark Joseph Aquino Isip, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/811,165

(22) Filed: Jul. 7, 2022

(65) Prior Publication Data
US 2023/0024413 A1  Jan. 26, 2023

(30) Foreign Application Priority Data

Jul. 26, 2021 (JP) .............................. JP2021-121846

(51) Int. Cl.
*H04L 27/34* (2006.01)
*H04L 27/26* (2006.01)
*H04L 5/00* (2006.01)

(52) U.S. Cl.
CPC ........ *H04L 27/3455* (2013.01); *H04L 5/0007* (2013.01); *H04L 5/0048* (2013.01); *H04L 27/261* (2013.01); *H04L 27/26025* (2021.01)

(58) Field of Classification Search
CPC ................. H04L 27/38; H04L 27/3455; H04L 27/26025; H04L 5/0007; H04L 5/0048; H04L 2027/0067; H04L 7/0079; H04L 27/3863; H04L 27/3818; H04L 27/3872; H04L 27/2602; H04L 27/2613

See application file for complete search history.

(56) References Cited

U.S. PATENT DOCUMENTS

| 11,528,121 | B2* | 12/2022 | Morita | ............... H04B 17/0085 |
| 2004/0005017 | A1* | 1/2004 | Borowski | ........... H04L 27/0014 375/279 |
| 2010/0013553 | A1* | 1/2010 | Ido | ...................... H04L 27/2647 329/316 |
| 2019/0173730 | A1* | 6/2019 | Nakayama | .............. H04L 27/38 |

FOREIGN PATENT DOCUMENTS

JP   6473429 B2   2/2019

* cited by examiner

*Primary Examiner* — Khanh C Tran
(74) *Attorney, Agent, or Firm* — Pearne & Gordon LLP

(57) ABSTRACT

Included are a demodulation unit 20 that demodulates a received OFDM modulation signal to acquire a demodulated constellation signal, an ideal constellation signal generation unit 312 that generates an ideal constellation signal from the demodulated constellation signal, a data extraction unit 313 that extracts signal data included in some symbol sections including a known reference symbol, among all symbol sections, from the demodulated constellation signal and the ideal constellation signal, a phase error calculation unit 314 that calculates the phase error of the demodulated constellation signal for the ideal constellation signal, with respect to the extracted signal data, a phase error characteristics estimation unit 315 that estimates the frequency characteristics of the phase error, and a phase error correction unit 316 that corrects the phase error of the demodulated constellation signal, based on the frequency characteristics of the phase error.

8 Claims, 17 Drawing Sheets

Correction: OFF
EVM: 8.95%

Correction: ON
(Without coarse correction)
EVM: 8.48%

RECEIVING DEVICE

TECHNICAL FIELD

The present invention relates to a receiving device that corrects a phase error of a demodulation signal.

BACKGROUND ART

In the related art, a transmission test for analyzing a signal transmitted from a Device Under Test (DUT) such as a mobile communication terminal and checking the transmission performance of the DUT has been performed using a mobile terminal test apparatus. The signal transmitted from the DUT is a modulation signal modulated according to a communication standard such as a wireless Local Area Network (LAN), Long Term Evolution (LTE), or 5G New Radio (NR).

In wideband wireless transmission systems such as wireless LAN, LTE, and 5G NR, the Orthogonal Frequency Division Multiplexing (OFDM) method having a good frequency utilization efficiency is widely used as the modulation method. The OFDM method is a block transmission method that synchronizes every predetermined data block. Specifically, the data string is demultiplexed on the transmitting side, converted into parallel data, mapped to each subcarrier, and then an Inverse Fast Fourier Transform (IFFT) process, D/A transformation, orthogonal modulation, or the like are performed to obtain a transmission signal. In addition, after conversion to a signal in the time domain by IFFT process, a part of the rear end of the signal is added to the front of the signal as a guard interval to make it resistant to inter-symbol interference due to multipath fading.

The mobile terminal test apparatus receives and demodulates the modulation signal generated in this manner, and performs signal analysis, and it is necessary to accurately perform demodulation in order to perform highly accurate analysis. However, for example, in a case where there is a frequency shift between a transmission signal generated by a DUT and a demodulation signal demodulated by a receiving device, a phase error shift (phase rotation) occurs in the demodulation signal, and it is not possible to recognize the accurate transmission performance of the DUT. Therefore, it is necessary to appropriately correct the phase error occurring in the demodulation signal. As an apparatus for correcting the phase error of a demodulation signal, for example, the apparatus described in Patent Document 1 is known.

Patent Document 1 discloses a configuration in which a phase synchronization process is performed by obtaining the frequency-to-phase characteristics from the constellation of the OFDM demodulation signal, changing the phase difference, and searching for the phase difference in which the gradient of the frequency-to-phase characteristics approaches zero.

RELATED ART DOCUMENT

Patent Document

[Patent Document 1] Japanese Patent No. 6473429

DISCLOSURE OF THE INVENTION

Problem that the Invention is to Solve

However, in the apparatus in the related art described in Patent Document 1, it has not been considered to accurately and efficiently acquire the frequency-to-phase characteristics used for the phase synchronization (that is, the correction of the phase error) of the demodulation signal. When the accuracy of the acquired frequency-to-phase characteristics is not high, there is a concern that the phase of the demodulation signal cannot be synchronized accurately and efficiently.

The present invention has been made to solve the above-mentioned problems in the related art, and a purpose thereof is to provide a receiving device capable of accurately and efficiently correcting a phase error of a demodulation signal.

Means for Solving the Problem

In order to achieve the above object, a receiving device of the present invention includes: a reception unit (10) that receives a modulation signal modulated by an orthogonal frequency division multiplexing (OFDM) method from a mobile communication terminal (2); a demodulation unit (20) that demodulates the received modulation signal to acquire a demodulated constellation signal; an ideal constellation signal generation unit (312) that generates an ideal constellation signal from the demodulated constellation signal; a data extraction unit (313) that selects and extracts a part of signal data, from the demodulated constellation signal and the ideal constellation signal; a phase error calculation unit (314) that calculates a phase error of the demodulated constellation signal with respect to the ideal constellation signal, regarding the extracted signal data; a phase error characteristics estimation unit (315) that estimates frequency characteristics or time characteristics of the phase error, based on the calculated phase error; and a phase error correction unit (316) that corrects the phase error of the demodulated constellation signal, based on the estimated frequency characteristics or time characteristics of the phase error, in which the data extraction unit extracts signal data included in some symbol sections including a known reference symbol, among all symbol sections, from the demodulated constellation signal and the ideal constellation signal.

As described above, in the receiving device of the present invention, the data extraction unit selects and extracts a part of signal data suitable for a predetermined condition, from the demodulated constellation signal (hereinafter, also simply referred to as the demodulation signal) and the ideal constellation signal. With respect to the extracted signal data, the phase error calculation unit calculates the phase error, and the phase error characteristics estimation unit estimates the frequency characteristics or time characteristics of the phase error (hereinafter, also simply referred to as the phase error characteristics) in the section of the extracted signal data. Then, the phase error correction unit corrects the phase error of the demodulated constellation signal, based on the estimated characteristics of the phase error. In this way, since the characteristics of the phase error can be estimated using only a part of the highly reliable signal data, by correcting the phase error based on the characteristics, the phase error of the demodulation signal can be corrected accurately and efficiently.

When phase rotation occurs in the demodulation signal, for example, the signal data included in some symbol sections including a known reference symbol such as Demodulation Reference Signal (DMRS), among all the symbol sections in one slot is highly reliable data for estimating the characteristics of phase error from the signal data of other symbols. Therefore, by estimating the characteristics of the phase error using only such signal data and correcting the phase error based on the characteristics, the phase error of the demodulation signal can be corrected accurately and efficiently.

Further, a receiving device of the present invention includes: a reception unit (10) that receives a modulation signal modulated by an orthogonal frequency division multiplexing (OFDM) method from a mobile communication terminal (2); a demodulation unit (20) that demodulates the received modulation signal to acquire a demodulated constellation signal; an ideal constellation signal generation unit (312) that generates an ideal constellation signal from the demodulated constellation signal; a data extraction unit (313) that selects and extracts a part of signal data, from the demodulated constellation signal and the ideal constellation signal; a phase error calculation unit (314) that calculates a phase error of the demodulated constellation signal with respect to the ideal constellation signal, regarding the extracted signal data; a phase error characteristics estimation unit (315) that estimates frequency characteristics or time characteristics of the phase error, based on the calculated phase error; and a phase error correction unit (316) that corrects the phase error of the demodulated constellation signal, based on the estimated frequency characteristics or time characteristics of the phase error, in which the data extraction unit extracts signal data corresponding to a predetermined ideal constellation point near an origin of an IQ plane, from the demodulated constellation signal and the ideal constellation signal.

When phase rotation occurs in the demodulation signal, the signal data corresponding to a predetermined ideal constellation point near the origin of the IQ plane is highly reliable data for determining the characteristics of phase error from the signal data corresponding to other ideal constellation points. Therefore, by estimating the characteristics of the phase error using only such signal data and correcting the phase error based on the characteristics, the phase error of the demodulation signal can be corrected accurately and efficiently.

Further, a receiving device of the present invention includes: a reception unit (10) that receives a modulation signal modulated by an orthogonal frequency division multiplexing (OFDM) method from a mobile communication terminal (2); a demodulation unit (20) that demodulates the received modulation signal to acquire a demodulated constellation signal; an ideal constellation signal generation unit (312) that generates an ideal constellation signal from the demodulated constellation signal; a data extraction unit (313) that selects and extracts a part of signal data, from the demodulated constellation signal and the ideal constellation signal; a phase error calculation unit (314) that calculates a phase error of the demodulated constellation signal with respect to the ideal constellation signal, regarding the extracted signal data; a phase error characteristics estimation unit (315) that estimates frequency characteristics or time characteristics of the phase error, based on the calculated phase error; and a phase error correction unit (316) that corrects the phase error of the demodulated constellation signal, based on the estimated frequency characteristics or time characteristics of the phase error, in which the data extraction unit extracts signal data corresponding to a symbol having an error vector magnitude (EVM) smaller than a predetermined reference value, from the demodulated constellation signal and the ideal constellation signal.

When phase rotation occurs in the demodulation signal, the signal data corresponding to the symbol having EVM smaller than the predetermined reference value is highly reliable data for determining the characteristics of phase error from the signal data corresponding to other symbols having high EVM. Therefore, by estimating the characteristics of the phase error using only such signal data and correcting the phase error based on the characteristics, the phase error of the demodulation signal can be corrected accurately and efficiently.

Further, the receiving device of the present invention may be configured to further include a second correction unit (32) that calculates a phase error between the demodulated constellation signal of which the phase error has been corrected by the phase error correction unit and the ideal constellation signal which is regenerated from the demodulated constellation signal of which the phase error has been corrected, estimates the frequency characteristics or time characteristics of the phase error, based on the calculated phase error, and corrects the phase error of the demodulated constellation signal, based on the estimated frequency characteristics or time characteristics of the phase error.

After estimating the characteristics of the phase error using only a part of the highly reliable signal data and performing rough correction of the phase error based on the characteristics, the second correction unit can correct the phase error of the demodulation signal accurately and efficiently, by estimating the characteristics of the phase error using all pieces of signal data included in all the frequency sections (all subcarrier sections) or all the symbol sections and performing the main correction of the phase error based on the characteristics.

Further, the receiving device of the present invention may be configured to further include a third correction unit (32A) that extracts signal data corresponding to a predetermined ideal constellation point near an origin of an IQ plane, from the demodulated constellation signal of which the phase error has been corrected by the phase error correction unit and the ideal constellation signal which is regenerated from the demodulated constellation signal of which the phase error has been corrected, calculates a phase error of the demodulated constellation signal with respect to the ideal constellation signal, regarding the extracted signal data, estimates the frequency characteristics or time characteristics of the phase error, based on the calculated phase error, and corrects the phase error of the demodulated constellation signal, based on the estimated frequency characteristics or time characteristics of the phase error.

After estimating the characteristics of the phase error using only a part of the highly reliable signal data and performing rough correction of the phase error based on the characteristics, the third correction unit estimates the characteristics of the phase error by using only signal data corresponding to a predetermined ideal constellation point near the origin of the IQ plane, and performs rough correction of the phase error based on the characteristics. In this way, by performing rough correction of the phase error in two steps by different methods, a more accurate ideal constellation signal can be obtained, and thereby the phase error of the demodulation signal can be corrected more efficiently and accurately.

Further, the receiving device of the present invention may be configured to further include:

a fourth correction unit (33A) that calculates a phase error between the demodulated constellation signal of which the phase error has been corrected by the third correction unit and the ideal constellation signal which is regenerated from the demodulated constellation signal of which the phase error has been corrected, estimates the frequency characteristics or time characteristics of the phase error, based on the calculated phase error, and corrects the phase error of the demodulated constellation signal, based on the estimated frequency characteristics or time characteristics of the phase error; and a fifth correction unit (34B) that extracts signal data corresponding to a symbol having EVM smaller than a predetermined reference value, from the demodulated constellation signal of which the phase error has been corrected by the fourth correction unit and the ideal constellation signal regenerated from the demodulated constellation signal of which the phase error has been corrected, calculates a phase error of the demodulated constellation signal with respect to the ideal constellation signal, regarding the extracted signal data, estimates the frequency characteristics or time characteristics of the phase error, based on the calculated phase error, and corrects the phase error of the demodulated constellation signal, based on the estimated frequency characteristics or time characteristics of the phase error.

After estimating the characteristics of the phase error using only some pieces of highly reliable signal data and performing rough correction of the phase error based on the characteristics, the fourth correction unit estimates the characteristics of the phase error by using the signal data of the all sections, and performs the main correction of the phase error based on the characteristics, and then the fifth correction unit estimates the characteristics of the phase error by using only the signal data corresponding to the symbol having the EVM smaller than the predetermined reference value, and performs rough correction of the phase error based on the characteristics. As described above, the phase error of the demodulation signal can be corrected more efficiently and accurately by performing the rough correction and the main correction of the phase error in a plurality of steps by different methods.

Further, the receiving device according to the present disclosure may further include a second correction unit (32) that calculates a phase error between the demodulated constellation signal of which the phase error has been corrected by the phase error correction unit and the ideal constellation signal which is regenerated from the demodulated constellation signal of which the phase error has been corrected, estimates the frequency characteristics or time characteristics of the phase error, based on the calculated phase error, and corrects the phase error of the demodulated constellation signal, based on the estimated frequency characteristics or time characteristics of the phase error.

Further, the receiving device according to the present disclosure may further include a second correction unit (32) that calculates a phase error between the demodulated constellation signal of which the phase error has been corrected by the phase error correction unit and the ideal constellation signal which is regenerated from the demodulated constellation signal of which the phase error has been corrected, estimates the frequency characteristics or time characteristics of the phase error, based on the calculated phase error, and corrects the phase error of the demodulated constellation signal, based on the estimated frequency characteristics or time characteristics of the phase error.

Advantage of the Invention

According to the present invention, it is possible to provide a receiving device capable of accurately and efficiently correcting a phase error of a demodulation signal.

BRIEF DESCRIPTION OF THE DRAWINGS

FIG. 2B illustrates a graph of a phase error with respect to a subcarrier (frequency), for a demodulation signal in which a large phase rotation occurs.

FIG. 6B illustrates a constellation when the phase error is corrected by using signal data in all frequency sections, and FIG. 6C illustrates a constellation when the phase error is corrected by using only signal data in a part of central frequency section.

BEST MODE FOR CARRYING OUT THE INVENTION

Hereinafter, embodiments of the present invention will be described with reference to the drawings.

First Embodiment

Figure 1:
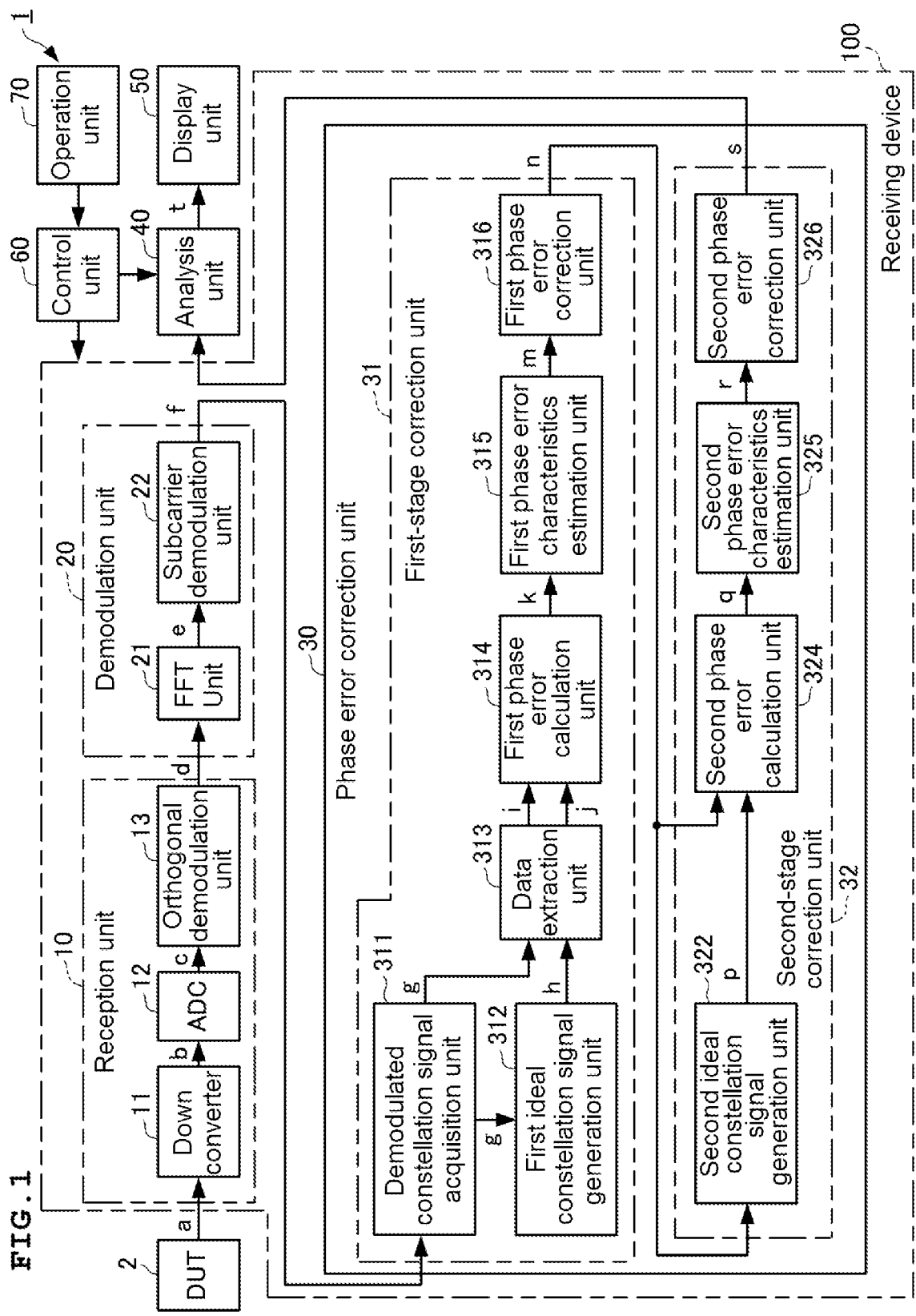
FIG. 1 is a block diagram illustrating a configuration of a mobile terminal test apparatus according to a first embodiment of the present invention.

As illustrated in FIG. 1, a mobile terminal test apparatus 1 according to a first embodiment of the present invention is configured to receive and analyze a modulation signal a transmitted from a device under test (DUT) 2 and test the transmitting performance of the DUT 2, and includes a reception unit 10, a demodulation unit 20, a phase error correction unit 30, an analysis unit 40, a display unit 50, a control unit 60, and an operation unit 70. The portion including the reception unit 10, the demodulation unit 20, and the phase error correction unit is also referred to as a receiving device 100. Examples of the DUT 2 include, but are not limited to, mobile communication terminals such as smartphones, mobile phones, and tablet terminals. The modulation signal a transmitted from the DUT 2 is an OFDM modulation signal modulated by, for example, an orthogonal frequency division multiplexing (OFDM) method according to a communication standard such as LTE or 5G NR. Hereinafter, each component will be described.

(Reception Unit)

The reception unit 10 receives the modulation signal a (OFDM modulation signal) transmitted from the DUT 2 via an antenna or by wire, and includes a down converter 11, an analog-to-digital converter (ADC) 12, and an orthogonal demodulation unit 13.

The down converter 11 includes a mixer and a local oscillator, inputs the modulation signal a transmitted from the DUT 2 and the local signal generated by the local oscillator to the mixer, down-converts the input signals, and generates an intermediate frequency (IF) signal b. The intermediate frequency signal b is sent to the ADC 12.

The ADC 12 samples the intermediate frequency signal b, which is frequency-converted by the down converter 11, and converts the sampled intermediate frequency signal b from an analog signal to a digital signal. An obtained digital intermediate frequency signal c is sent to the orthogonal demodulation unit 13.

The orthogonal demodulation unit 13 frequency-converts the digital intermediate frequency signal c output from the ADC 12 into a baseband signal, and orthogonally demodulates it into an I-phase component and a Q-phase component. The obtained orthogonal demodulation signal d is sent to the demodulation unit 20. The orthogonal demodulation signal d is a complex signal.

In the above description, in the reception unit 10, the modulation signal is converted into an intermediate frequency signal by the down converter 11, but may be converted into a baseband signal by the down converter 11. Further, a signal synchronization unit may be provided between the orthogonal demodulation unit 13 and the demodulation unit 20, and symbols or frames may be synchronized with respect to the orthogonal demodulation signal d.

(Demodulation Unit)

The demodulation unit 20 OFDM-demodulates the orthogonal demodulation signal d output from the orthogonal demodulation unit 13 of the reception unit 10, and includes a fast Fourier transform (FFT) unit 21 and a subcarrier demodulation unit 22.

The FFT unit 21 performs a fast Fourier transform process on the orthogonal demodulation signal d output from the orthogonal demodulation unit 13 to generate a frequency domain signal e. If necessary, Cyclic Prefix (CP) is removed from each symbol of the orthogonal demodulation signal d, before the FFT process is performed by the FFT unit 21. The generated frequency domain signal e is sent to the subcarrier demodulation unit 22.

A transmission line estimation/correction unit may be provided between the FFT unit 21 and the subcarrier demodulation unit 22. The transmission line estimation/correction unit corrects the transmission line by estimating the transmission line using, for example, a pilot signal, with respect to the frequency domain signal e output from the FFT unit 21. When the transmission line estimation/correction unit is provided, the corrected frequency domain signal is sent to the subcarrier demodulation unit 22.

The subcarrier demodulation unit 22 performs a demodulation process on the frequency domain signal e for each subcarrier to generate an OFDM demodulation signal f. The OFDM demodulation signal f is sent to the phase error correction unit 30.

The phase error correction unit 30 corrects the phase error of the OFDM demodulation signal f, which will be described in detail later. The OFDM demodulation signal s of which phase error has been corrected is sent to the analysis unit 40.

(Analysis Unit/Display Unit)

The analysis unit 40 is configured to measure and analyze, for example, transmission power, Error Vector Magnitude (EVM), constellation, spectrum, or the like, with respect to the OFDM demodulation signal s of which phase error has been corrected, output from the phase error correction unit 30, and test the transmission performance of the DUT 2. The measurement and analysis result by the analysis unit 40 is sent to the display unit 50.

The display unit 50 displays, on a liquid crystal display or the like, the test result of the DUT 2, including data and graphs of the measurement and analysis result sent from the analysis unit 40.

The operation unit 70 is operated by the user to set parameters such as measurement items and measurement conditions for testing the DUT 2, and determination conditions, and examples thereof include a touch panel, a keyboard composed of hardware keys, an input device such as a dial or a mouse, and a control circuit for controlling these.

The control unit 60 receives an input from the operation unit 70, sets various parameters, and controls functional units such as the reception unit 10, the demodulation unit 20, the phase error correction unit 30, the analysis unit 40, and the display unit 50.

(Data Structure)

Here, an example of the data structure of the modulation signal a transmitted from the DUT 2 will be described.

For example, the modulation signal a is composed of a plurality of consecutive frames when viewed in a time axis direction, and one frame is composed of 10 subframes. The time length of one subframe is 1 ms, so the time length of one frame is 10 ms. The subframe is composed of one or a plurality of slots, and the number of slots included in one subframe is determined according to the subcarrier interval. One slot contains, for example, 14 symbols.

Seen in the frequency direction, the modulation signal a is composed of a plurality of resource blocks, and one resource block includes, for example, 12 consecutive subcarriers.

(Phase Error)

Figure 2A:
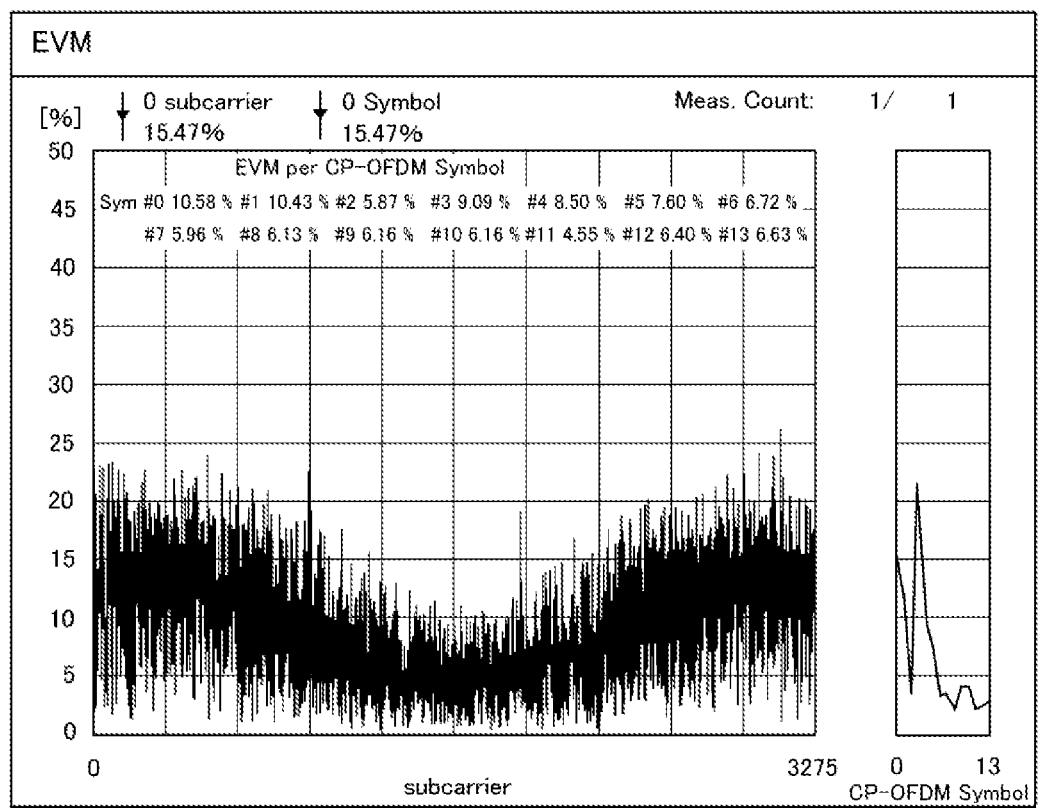
FIGS. 2A and 2B FIG. 2A illustrates a graph of EVM with respect to a subcarrier (frequency)

When the OFDM demodulation signal f contains a large phase rotation, it becomes difficult to accurately evaluate the modulation accuracy. FIG. 2A illustrates, as an example, a graph of EVM with respect to a subcarrier (frequency), for a demodulation signal having a phase rotation. The EVM is small in the central subcarrier section, and the EVM is large in the subcarrier sections at both ends.

Figure 2B:
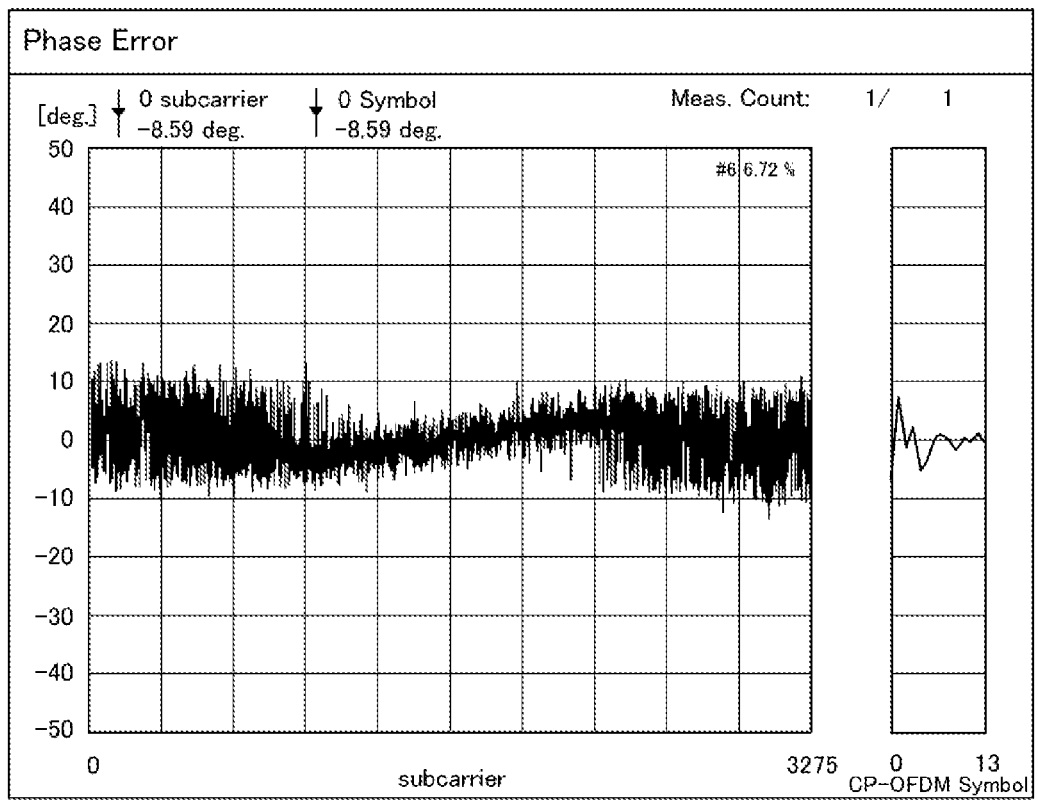

FIG. 2B illustrates, as an example, a graph of the phase error with respect to a subcarrier (frequency), for a demodulation signal having a phase rotation. The phase error indicates linear frequency characteristics inclined in the central subcarrier section, and linear frequency characteristics as in the center is not recognized in the subcarrier sections at both ends.

Figure 3:
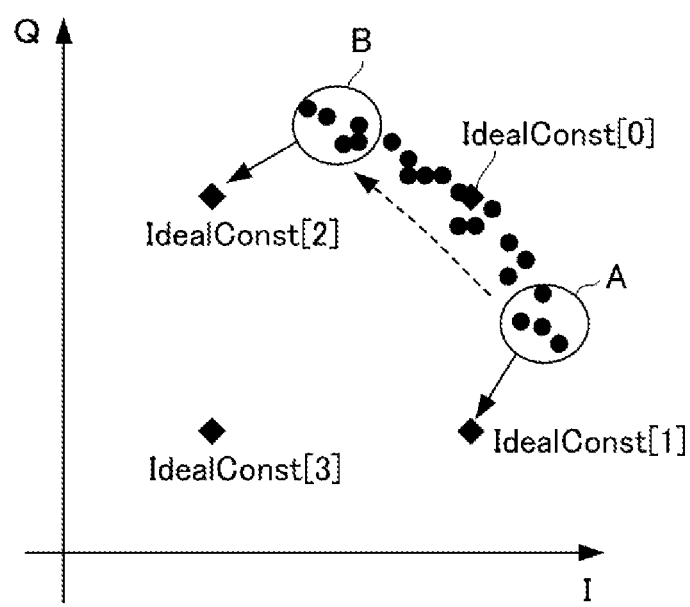
FIG. 3 is an explanatory diagram showing a state in which an abnormality in a phase error occurs due to phase rotation.

FIG. 3 is an explanatory diagram showing a state in which an abnormality in a phase error occurs due to phase rotation.

If there is a frequency error in the components such as the DUT 2 and the reception unit 10, phase rotation occurs in the IQ data string constituting the OFDM demodulation signal f as illustrated in FIG. 3. In the present specification, a phenomenon in which the phase error increases in proportion to the elapsed time with the passage of time is referred to as phase rotation.

In FIG. 3, the demodulation constellation points present around the ideal constellation point IdealConst[0] are spread out in an arc shape around the origin of the IQ plane. At this time, the demodulation constellation points present in the part A have a shorter distance from the ideal constellation point IdealConst[1] than the distance from the ideal constellation point IdealConst[0]. Further, the demodulation constellation points present in the part B have a shorter distance from the ideal constellation point IdealConst[2] than the distance from the ideal constellation point IdealConst[0]. Therefore, the demodulation constellation points present in the part A are erroneously recognized as having the corresponding ideal constellation points in IdealConst[1], and the demodulation constellation points present in the part B are erroneously recognized as having the corresponding ideal constellation points in IdealConst[2].

When the corresponding ideal constellation point is erroneously recognized in this way, the phase error deviates greatly from the original value, and the EVM also deviates from the true value. In the present embodiment, the transmission performance of the DUT 2 is tested by obtaining information on the true phase error by correcting the phase error caused by the phase rotation and obtaining a value such as EVM based on the information.

(Phase Error Correction Unit)

Next, the phase error correction unit 30 will be described.

The phase error correction unit 30 corrects the phase error of the OFDM demodulation signal f output from the demodulation unit 20, and includes a first-stage correction unit 31 and a second-stage correction unit 32. The first-stage correction unit 31 performs rough correction of the phase error, and includes a demodulated constellation signal acquisition unit 311, a first ideal constellation signal generation unit 312, a data extraction unit 313, a first phase error calculation unit 314, a first phase error characteristics estimation unit 315, and a first phase error correction unit 316. The second-stage correction unit 32 performs main correction of the phase error, and includes a second ideal constellation signal generation unit 322, a second phase error calculation unit 324, a second phase error characteristics estimation unit 325, and a second phase error correction unit 326. The second-stage correction unit 32 of the present embodiment corresponds to the second correction unit of the present invention. Hereinafter, each component will be described.

The demodulated constellation signal acquisition unit 311 of the first-stage correction unit 31 acquires the OFDM demodulation signal f from the subcarrier demodulation unit 22, and stores it as a demodulated constellation signal DemodConst[n]. Here, n is a data number, n=0, 1, . . . , and N−1, and N is the total number of data pieces. That is, the demodulated constellation signal is a discrete signal data string, and each piece of signal data is complex data having an I-phase component and a Q-phase component.

Figure 4:
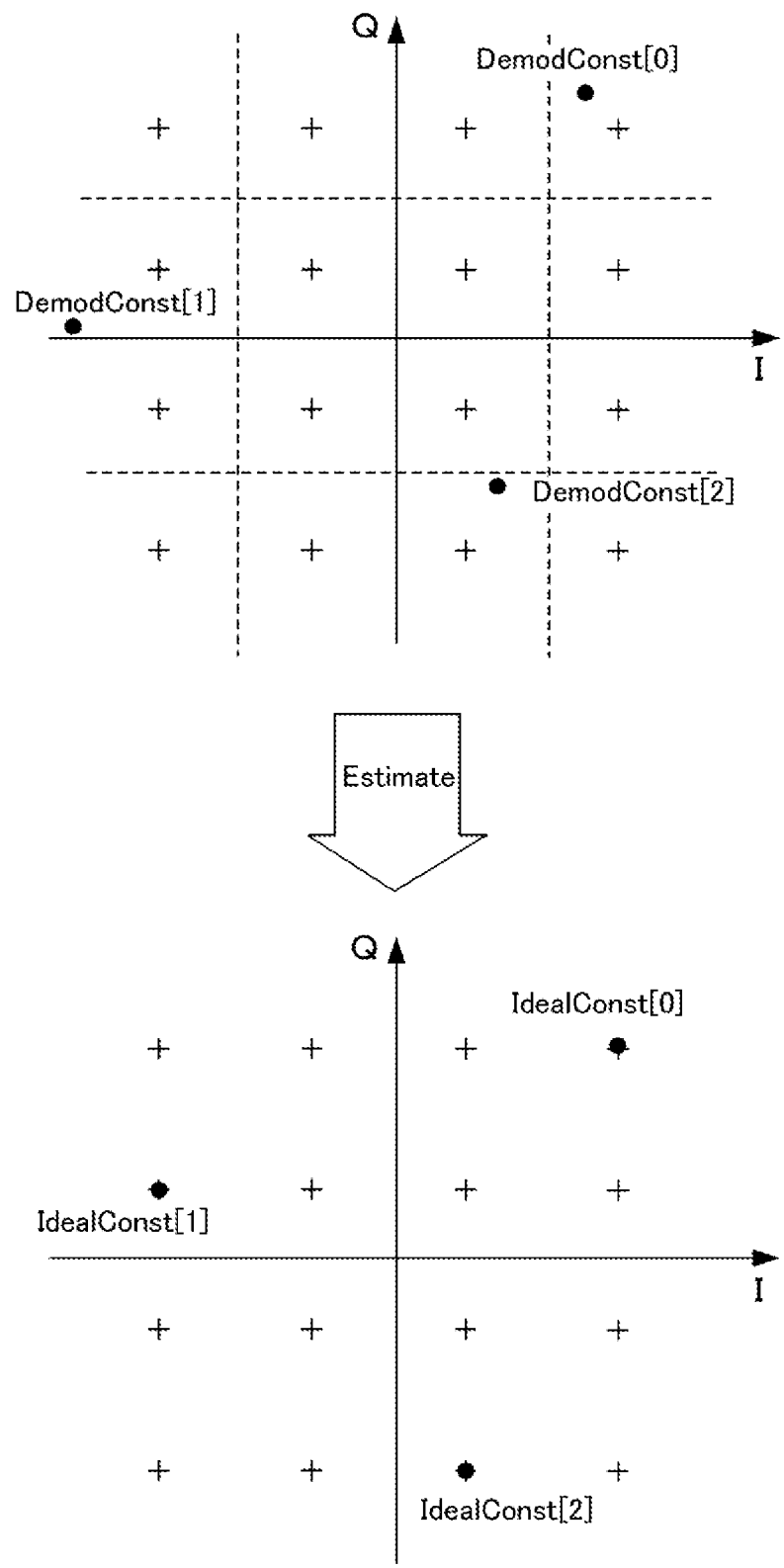
FIG. 4 is a diagram illustrating a method of generating an ideal constellation signal from a demodulated constellation signal.

The first ideal constellation signal generation unit 312 generates an ideal constellation signal IdealConst[n] from the demodulated constellation signal DemodConst[n]. FIG. 4 is a diagram illustrating a method of generating an ideal constellation signal from a demodulated constellation signal. In the upper diagram of FIG. 4, as an example, three pieces of signal data of the demodulated constellation signal, that is, DemodConst[0], DemodConst[1], and DemodConst[2], are plotted on the IQ plane. The ideal constellation on the IQ plane is indicated by a "+" mark.

In the lower diagram of FIG. 4, the closest ideal constellation points IdealConst[0], IdealConst[1], and IdealConst[2] are plotted on the IQ plane, from the constellation points of three pieces of signal data DemodConst[0], DemodConst[1], and DemodConst[2] of the demodulated constellation signal. That is, it is estimated that the three pieces of signal data DemodConst[0], DemodConst[1], and DemodConst[2] of the demodulated constellation signal correspond to the ideal constellation points IdealConst[0], IdealConst[1], and IdealConst[2], respectively. In this way, each piece of signal data IdealConst[n] of the closest ideal constellation signal on the IQ plane is generated, from each piece of signal data DemodConst[n] of the demodulated constellation signal. Here, n=0, 1, . . . , and N−1, and N is the total number of data pieces.

The data extraction unit 313 selects and extracts a part of signal data suitable for a predetermined condition, from the demodulated constellation signal and the ideal constellation signal. Specifically, the data extraction unit 313 extracts signal data corresponding to subcarriers included in a part of an intermediate or central frequency section among all the frequency sections including all the subcarriers, from the demodulated constellation signal and the ideal constellation signal.

Figure 5:
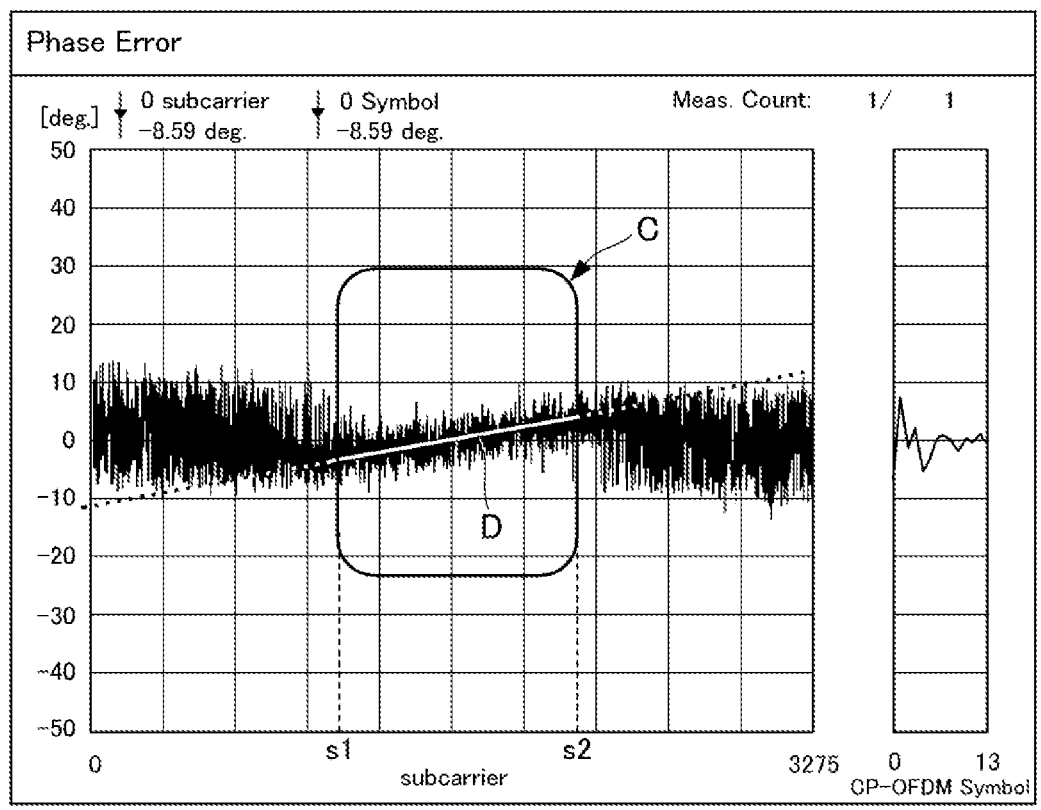
FIG. 5 is a diagram showing a graph of a phase error with respect to a subcarrier (frequency), in which an approximate straight line showing a set frequency section and frequency characteristics of the phase error in the frequency section is shown.

FIG. 5 is a diagram showing a graph of the phase error with respect to the subcarrier (frequency) when the demodulation signal has a phase rotation. The horizontal axis is the subcarrier number, and as the subcarrier number increases, the frequency increases by the subcarrier interval. Therefore, the horizontal axis may be considered to represent the frequency. FIG. 5 illustrates a set frequency section C and an approximate straight line D showing the frequency characteristics of the phase error in the frequency section C.

FIG. 5 also illustrates a graph of phase error for CP-OFDM symbols (0 to 13) on the right side. Since the horizontal axis is the symbol number and the elapsed time increases as the symbol number increases, the horizontal axis may be considered to represent time.

For example, in FIG. 5, the data extraction unit 313 extracts signal data corresponding to the subcarriers (s1 to s2) included in a central frequency section C among all frequency sections including all subcarriers (0 to 3275). That is, the signal data DemodConst[m] and IdealConst[m] of the data number m satisfying s1≤subcarrier number s2 are extracted, respectively.

Assuming that signal data of p data numbers $m_1$, $m_2$, . . . , and $m_p$ are extracted, the extracted signal data is expressed as follows.

Demodulated constellation signal: DemodConst[$m_i$]

Ideal constellation signal: IdealConst[$m_i$]

Here, i=1, 2, . . . , and p.

The part of frequency section C is, but is not limited to, set to, for example, 20% to 40% of all the frequency sections, preferably, the center 30% of all the frequency sections, and more preferably, the center 20%.

Further, the part of frequency section C does not necessarily need to be set in the center of all the frequency sections, may be set off the center if necessary, or may be set to include one end of all the frequency sections.

The first phase error calculation unit 314 calculates the phase error Phase Error[$m_i$]} of the demodulated constellation signal with respect to the ideal constellation signal, with respect to the extracted signal data. Here, i=1, 2, ..., and p (p is the number of extracted data pieces).

Specifically, the phase of the signal data of the data numbers $m_1, m_2, \ldots,$ and $m_p$ is expressed by the following equation.

Demodulated constellation signal: DemodPhase[$m_i$]
=arg (DemodConst[$m_i$])          (1)

Ideal constellation signal: IdealPhase[$m_i$]=arg(IdealConst[$m_i$])          (2)

Here, i=1, 2, ..., and p (p is the number of extracted data pieces).

Therefore, for each piece of signal data extracted from the demodulated constellation signal, the phase error from each piece of signal data of the corresponding ideal constellation signal is expressed as follows.

PhaseError[$m_i$]=DemodPhase[$m_i$]−IdealPhase[$m_i$]=arg (DemodConst[$m_i$])−arg(IdealConst[$m_i$])          (3)

Here, i=1, 2, ..., and p (p is the number of extracted data pieces).

The first phase error characteristics estimation unit 315 estimates the frequency characteristics of the phase error based on the calculated phase error. Specifically, for example, as illustrated in FIG. 5, the frequency characteristics of the phase error in the frequency section C is approximated by the straight line D. The straight line D represented by the linear equation can be obtained by, for example, the least squares method. The straight line D representing the frequency characteristics of the phase error is interpolated as indicated by a broken line outside the frequency section C and can be applied to all frequency sections.

The first phase error correction unit 316 corrects the phase error of the demodulated constellation signal in all the frequency sections, based on the frequency characteristics of the phase error.

Specifically, the first phase error correction unit 316 corrects the phase error by rotating the phase of the demodulated constellation signal in all the frequency sections such that the inclination of the straight line D that approximates the frequency characteristics of the phase error zero, that is, the straight line D is parallel to the frequency axis (horizontal axis). By obtaining the demodulated constellation signal of which the phase error has been corrected in this way, an accurate ideal constellation signal can be obtained by the second ideal constellation signal generation unit 322 to be described later. In other words, the first-stage correction unit 31 is to obtain a more accurate ideal constellation signal.

Next, the second-stage correction unit 32 that performs the main correction of the phase error will be described.

The second-stage correction unit 32 calculates a phase error between the demodulated constellation signal of which phase error has been corrected by the first phase error correction unit 316 and an ideal constellation signal which is regenerated from the demodulated constellation signal of which phase error has been corrected, estimates frequency characteristics of a phase error, based on the calculated phase error, and corrects a phase error of the demodulated constellation signal, based on the estimated frequency characteristics of the phase error.

Specifically, the second ideal constellation signal generation unit 322 regenerates the ideal constellation signal, by specifying the ideal constellation point closest to each piece of signal data on the IQ plane, from the demodulated constellation signal of which phase error has been corrected by the first phase error correction unit 316.

The second phase error calculation unit 324 calculates the phase error between the demodulated constellation signal of which phase error has been corrected by the first phase error correction unit 316 and the ideal constellation signal regenerated by the second ideal constellation signal generation unit 322.

The second phase error characteristics estimation unit 325 obtains an approximate straight line showing the frequency characteristics of the phase error in all the frequency sections, for example, by the least squares method, from the phase error calculated by the second phase error calculation unit 324.

The second phase error correction unit 326 corrects again the phase error of the demodulated constellation signal of which phase error is corrected by the first phase error correction unit 316, based on the frequency characteristics of the phase error estimated by the second phase error characteristics estimation unit 325. The demodulated constellation signal of which phase error has been corrected by the second phase error correction unit 326 is sent to the analysis unit 40 as an OFDM demodulation signal s of which phase error has been corrected.

The demodulated constellation signal of which phase error has been roughly corrected by the first-stage correction unit 31 may be sent to the analysis unit 40 for signal analysis as the OFDM demodulation signal s of which phase error has been corrected.

The mobile terminal test apparatus 1 and the receiving device 100 according to the present embodiment include individually or as a whole, computers including, for example, a Central Processing Unit (CPU), a Read Only Memory (ROM), a Random Access Memory (RAM), an input/output interface, a storage device such as a hard disk, and the like. Thus, for example, some or all of the functions of the reception unit 10, the demodulation unit 20, the phase error correction unit 30, the analysis unit 40, the display unit 50, the control unit 60, the operation unit 70, and the like can be achieved by reading the various processing programs stored in the ROM or the storage device into the RAM and executing the programs in the CPU. For example, the control unit 60 may be a computer.

Figure 7:
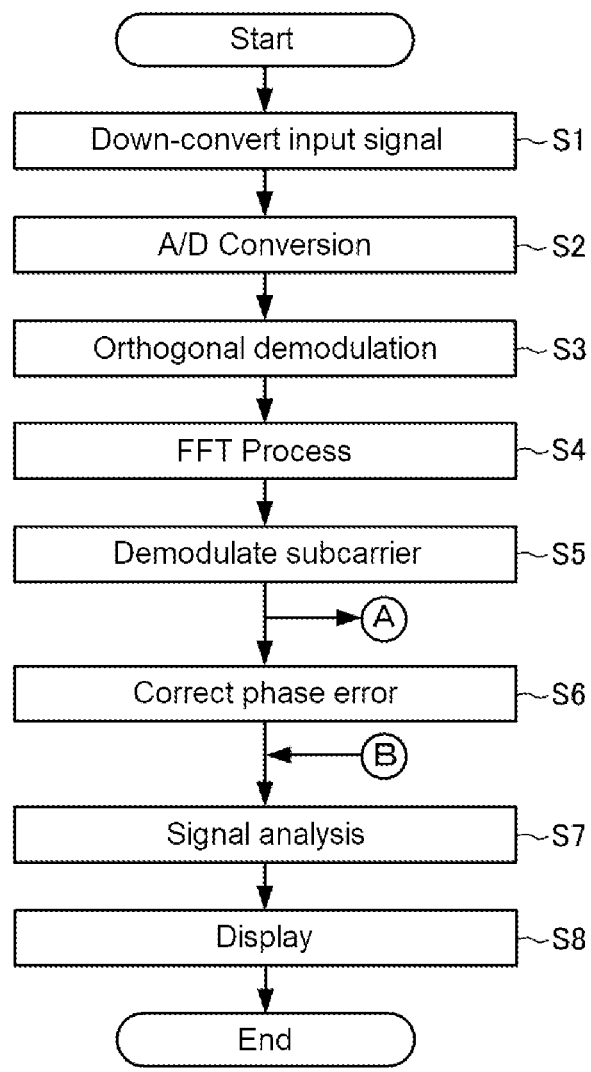
FIG. 7 is a diagram showing a flowchart of a mobile terminal test performed by using the mobile terminal test apparatus according to the first embodiment.

Next, a mobile terminal test method performed using the mobile terminal test apparatus 1 according to the first embodiment will be described with reference to FIGS. 1 and 7.

The DUT 2 transmits a modulation signal a modulated by the OFDM modulation method.

The reception unit 10 receives the modulation signal a via the antenna or by wire and inputs the modulation signal a to the down converter 11.

The down converter 11 down-converts the modulation signal a transmitted from the DUT 2 into an intermediate frequency signal b having an intermediate frequency (step S1). The intermediate frequency signal b is sent to the ADC 12.

The ADC 12 samples the analog intermediate frequency signal b to generate the digital intermediate frequency signal c (step S2). Sampling is performed, for example, 14640 times, 30720 times, or 61440 times per 14 symbols (1 slot). The digital intermediate frequency signal c is sent to the orthogonal demodulation unit 13.

The orthogonal demodulation unit 13 orthogonally demodulates the digital intermediate frequency signal c sent from the ADC 12 to the baseband signal to generate an orthogonal demodulation signal d (step S3). The orthogonal demodulation signal d is a complex signal in the time domain and has an I-phase component and a Q-phase component. The orthogonal demodulation signal d is sent to the FFT unit 21 of the demodulation unit 20.

The FFT unit 21 performs a fast Fourier transform on the orthogonal demodulation signal d of the time domain output by the orthogonal demodulation unit 13 to acquire the frequency domain signal e (step S4). The frequency domain signal e is sent to the subcarrier demodulation unit 22.

The subcarrier demodulation unit 22 performs a demodulation process for each subcarrier from the frequency domain signal e to acquire the OFDM demodulation signal f (step S5). The demodulation process for each subcarrier is a demodulation process corresponding to the modulation method performed for each subcarrier in the DUT 2, and examples thereof include Binary Phase Shift Keying (BPSK), Quadrature Phase Shift Keying (QPSK), 8 Phase Shift Keying (PSK), 16 Quadrature Amplitude Modulation (QAM), 64QAM, and the like. The OFDM demodulation signal f is sent to the phase error correction unit 30.

The phase error correction unit 30 corrects the phase error of the OFDM demodulation signal f, as will be described in detail later (step S6). The OFDM demodulation signal s of which phase error has been corrected is sent to the analysis unit 40.

The analysis unit 40 measures and analyzes, for example, transmission power, EVM, constellation, spectrum, and the like with respect to the OFDM demodulation signal s of which phase error has been corrected by the phase error correction unit 30 (step S7).

The display unit 50 displays information t such as measurement and analysis result data and graphs obtained by the analysis unit 40 in step S7 (step S8).

Figure 8:
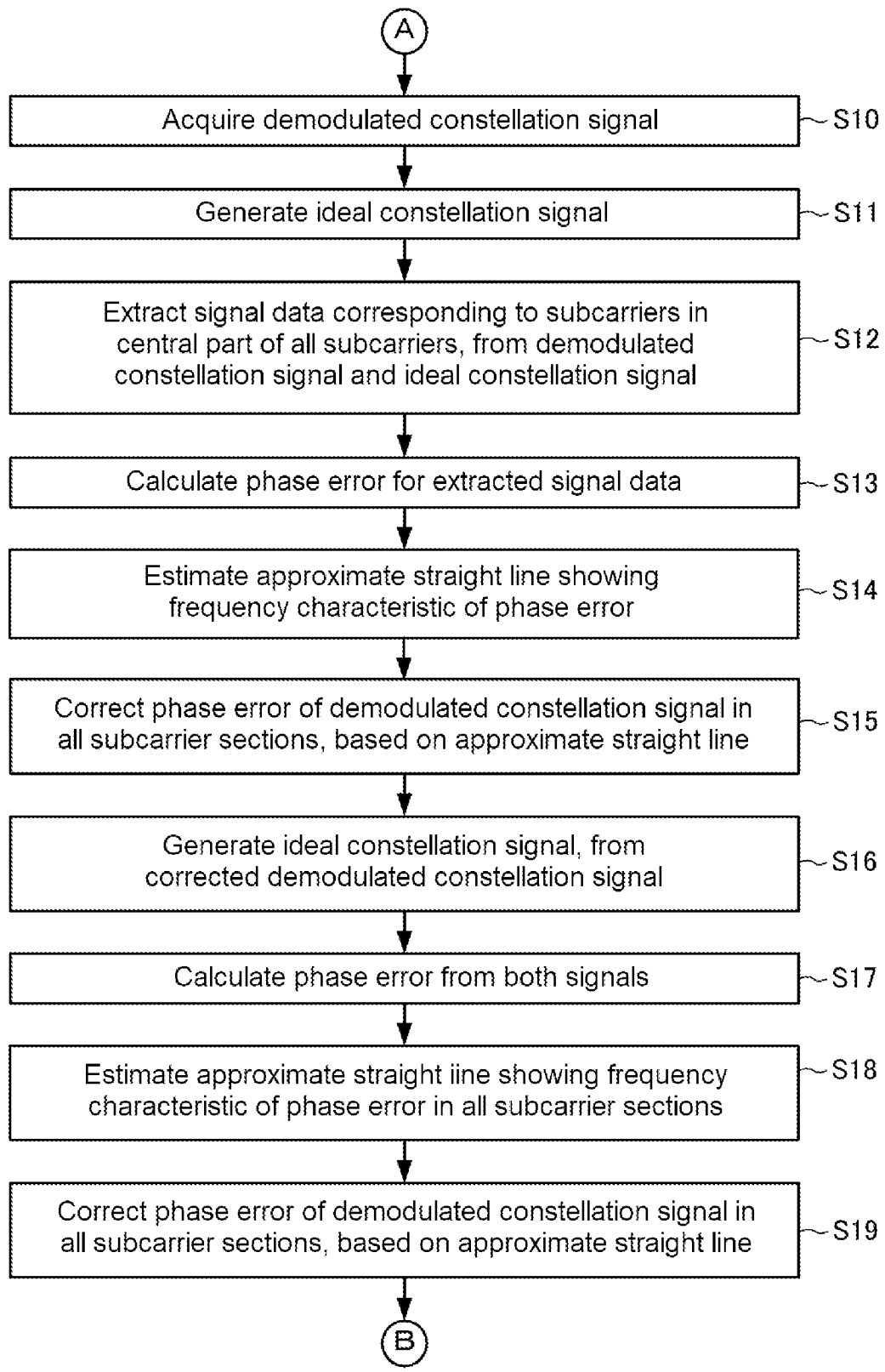
FIG. 8 is a diagram showing a flowchart of a mobile terminal test performed by using the mobile terminal test apparatus according to the first embodiment.

Next, the phase error correction process will be described with reference to FIGS. 1 and 8.

In the phase error correction unit 30, the demodulated constellation signal acquisition unit 311 acquires the OFDM demodulation signal f as a "demodulated constellation signal" from the subcarrier demodulation unit 22 of the demodulation unit 20 and stores it (step S10). The demodulated constellation signal g is a complex digital signal having an I-phase component and a Q-phase component. The demodulated constellation signal g is sent to the first ideal constellation signal generation unit 312 and the data extraction unit 313.

The first ideal constellation signal generation unit 312 generates the ideal constellation signal h from the demodulated constellation signal g (step S11). Specifically, the first ideal constellation signal generation unit 312 generates an ideal constellation signal h, by obtaining the ideal constellation point having the closest distance on the IQ plane, for each piece of signal data of the demodulated constellation signal. The ideal constellation signal h is sent to the data extraction unit 313.

The data extraction unit 313 extracts signal data corresponding to the subcarriers included in a part of central frequency section among all the frequency sections including all subcarriers, from the demodulated constellation signal and the ideal constellation signal (step S12). The frequency section from which the signal data is extracted is a section where the frequency characteristics of the phase error is significantly shown, and is, for example, a section of the center 20% of all frequency sections. The frequency section from which the signal data is extracted also changes depending on the modulation method of the subcarrier, and generally, the larger a multivalency, the narrower a frequency section. The frequency section from which the signal data is extracted may be set by the user via the operation unit 70, or may be set based on a predetermined standard, by measuring EVM or phase error in all frequency sections, and comparing the average value with a predetermined threshold value.

The first phase error calculation unit 314 calculates the phase error for the signal data extracted from the demodulated constellation signal and the ideal constellation signal by the data extraction unit 313 (step S13).

The first phase error characteristics estimation unit 315 estimates an approximate straight line showing a relationship between the phase error and the frequency (that is, the frequency characteristics of the phase error), from the phase error data calculated by the first phase error calculation unit 314 in a part of set frequency section (step S14).

The first phase error correction unit 316 corrects the phase error of the demodulated constellation signal in all the frequency sections, by using the approximate straight line obtained by the first phase error characteristics estimation unit 315 (step S15). Specifically, the phase of each piece of signal data of the demodulated constellation signal is rotated such that the slope of the approximate straight line indicating the frequency characteristics of the phase error becomes zero. In this way, the first-stage correction unit 31 roughly corrects the phase error of the demodulation signal by using the data signal in a part of frequency section among all the frequency sections.

Next, the second ideal constellation signal generation unit 322 of the second-stage correction unit 32 regenerates the ideal constellation signal, from the demodulated constellation signal of which phase error has been corrected by the first phase error correction unit 316, in the same way as the first ideal constellation signal generation unit 312 (step S16).

The second phase error calculation unit 324 calculates the phase error in all frequency sections, from the demodulated constellation signal of which phase error has been corrected by the first phase error correction unit 316 and the ideal constellation signal regenerated by the second ideal constellation signal generation unit 322 (step S17).

The second phase error characteristics estimation unit 325 estimates an approximate straight line showing the frequency characteristics of the phase error in all the frequency sections, from the phase error calculated by the second phase error calculation unit 324 (step S18).

The second phase error correction unit 326 corrects the phase error of the demodulated constellation signal in all the frequency sections, based on the approximate straight line estimated by the second phase error characteristics estimation unit 325 (step S19). In this way, the second-stage correction unit 32 acquires the frequency characteristics of the phase error by using the data signals in all the frequency sections, and mainly corrects the phase error based on the frequency characteristics. The demodulated constellation signal of which phase error has been corrected is sent to the analysis unit 40. The demodulated constellation signal of which phase error is roughly corrected by the first-stage correction unit 31 may be sent to the analysis unit 40 for signal analysis.

Figure 6A:
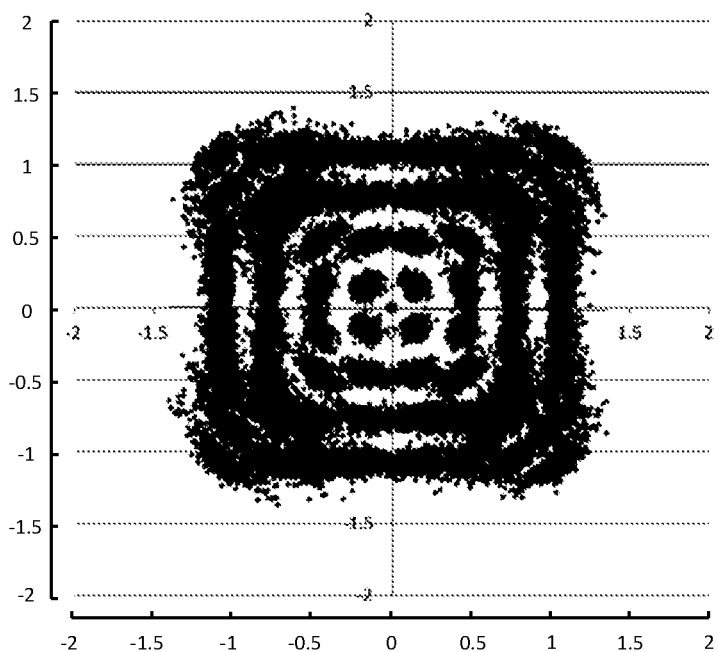
FIGS. 6A to 6C FIG. 6A illustrates a constellation when the phase error of the demodulation signal is not corrected.
Figure 6B:
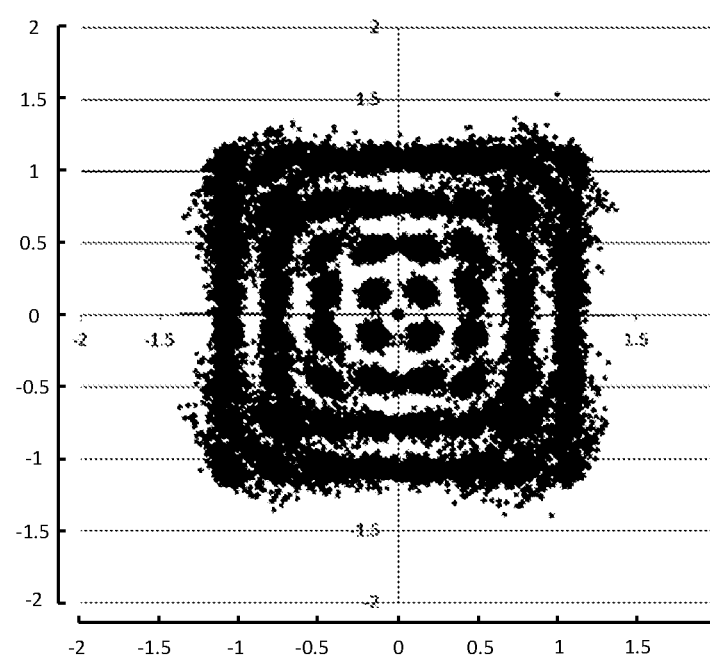
Figure 6C:
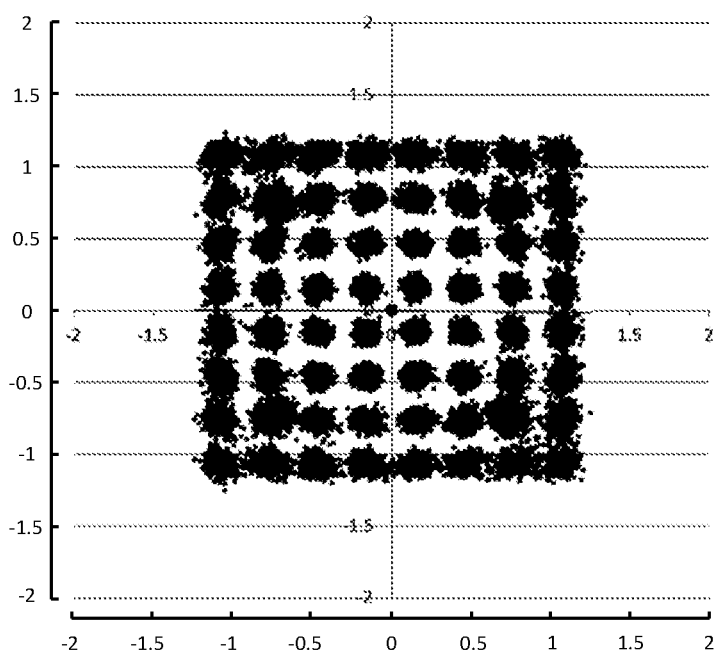

FIG. 6A illustrates the constellation of the demodulation signal when the phase error is not corrected. When the phase error is not corrected, an abnormality of the phase error due to the phase rotation appears in the constellation, and the constellation is disturbed. FIG. 6B illustrates a constellation when the frequency characteristics of the phase error is obtained using the signal data in all the frequency sections and the phase error is corrected based on the frequency characteristics (only main correction is performed, and rough correction is not performed). The constellation is improved compared to the case where the phase error is not corrected, but the constellation is still disturbed at the four peripheral corners. FIG. 6C illustrates the constellation of the demodulation signal when the rough correction is performed before the main correction is performed, according to the first embodiment. It can be seen that the constellation is not disturbed as compared with the case of only the main correction illustrated in FIG. 6B, and the improvement is significant as compared with the case where only the main correction is performed.

Next, the action and effect will be described.

As described above, in the receiving device 100 and the mobile terminal test apparatus 1 according to the present embodiment, the data extraction unit 313 extracts signal data corresponding to subcarriers included in a part of central frequency section among all the frequency sections including all the subcarriers, from the demodulated constellation signal and the ideal constellation signal. With respect to the extracted signal data, the first phase error calculation unit 314 calculates the phase error, and the first phase error characteristics estimation unit 315 estimates the frequency characteristics of the phase error in the section of the extracted signal data. Then, the first phase error correction unit 316 corrects the phase error of the demodulated constellation signal, based on the estimated frequency characteristics of the phase error. In this way, since the frequency characteristics of the phase error can be estimated using only a part of the highly reliable signal data, by correcting the phase error based on the characteristics, the phase error of the demodulation signal can be corrected accurately and efficiently.

Further, in the receiving device 100 and the mobile terminal test apparatus 1 according to the present embodiment, after the first-stage correction unit 31 estimates the frequency characteristics of the phase error using only a part of the highly reliable signal data and performs rough correction of the phase error based on the frequency characteristics, the second-stage correction unit 32 can correct the phase error of the demodulation signal accurately and efficiently, by estimating the frequency characteristics of the phase error using signal data included in all the frequency sections (all subcarrier sections) and performing the main correction of the phase error based on the frequency characteristics. In particular, since the ideal constellation signal is regenerated after the rough correction of the phase error, the phase error is calculated based on the more accurate ideal constellation signal, so that it is possible to estimate the frequency characteristics of the phase error more accurately.

Modification Example 1

In the first embodiment, the data extraction unit 313 may extract signal data included in some symbol sections including a known reference symbol, among all symbol sections, from the demodulated constellation signal g and the ideal constellation signal h. In this case, the first phase error characteristics estimation unit 315 estimates an approximate straight line indicating the time characteristics of the phase error, from the phase error data of some symbol sections calculated by the first phase error calculation unit 314. The first phase error correction unit 316 corrects the phase error for all the symbol sections by using the linear approximation formula extended to all the symbol sections.

When phase rotation occurs in the demodulation signal, for example, the signal data included in some symbol sections including a known reference symbol such as DMRS, among all the symbol sections in one slot is highly reliable data for estimating the characteristics of phase error from the signal data of other symbols. Therefore, by estimating the characteristics of the phase error using only such signal data and correcting the phase error based on the characteristics, the phase error of the demodulation signal can be corrected accurately and efficiently.

Modification Example 2

In the first embodiment, the data extraction unit 313 may extract signal data corresponding to a predetermined ideal constellation point near the origin of the IQ plane, from the demodulated constellation signal g and the ideal constellation signal h. In this case, the first phase error characteristics estimation unit 315 estimates an approximate straight line showing the frequency characteristics or time characteristics of the phase error, from the phase error data calculated by the first phase error calculation unit 314 in some sections corresponding to the extracted data. The first phase error correction unit 316 corrects the phase error for all the sections, by using the linear approximation formula extended to all the sections.

When phase rotation occurs in the demodulation signal, the signal data corresponding to a predetermined ideal constellation point near the origin of the IQ plane is highly reliable data for determining the characteristics of phase error from the signal data corresponding to other ideal constellation points. Therefore, by estimating the characteristics of the phase error using only such signal data and correcting the phase error based on the characteristics, the phase error of the demodulation signal can be corrected accurately and efficiently.

Modification Example 3

In the first embodiment, the data extraction unit 313 may extract signal data corresponding to a symbol having an error vector magnitude (EVM) smaller than a predetermined reference value, from the demodulated constellation signal g and the ideal constellation signal h. In this case, the first phase error characteristics estimation unit 315 estimates an approximate straight line showing the time characteristics of the phase error, from the phase error data calculated by the first phase error calculation unit 314 in some symbol sections corresponding to the extracted data. The first phase error correction unit 316 corrects the phase error for all the symbol sections by using the linear approximation formula extended to all the symbol sections.

When phase rotation occurs in the demodulation signal, the signal data corresponding to the symbol having EVM smaller than the predetermined reference value is highly reliable data for determining the characteristics of phase error from the signal data corresponding to other symbols having high EVM. Therefore, by estimating the characteristics of the phase error using only such signal data and correcting the phase error based on the characteristics, the phase error of the demodulation signal can be corrected accurately and efficiently.

Second Embodiment

Next, a receiving device and a mobile terminal test apparatus according to a second embodiment of the present invention will be described with reference to the drawings.

Figure 9:
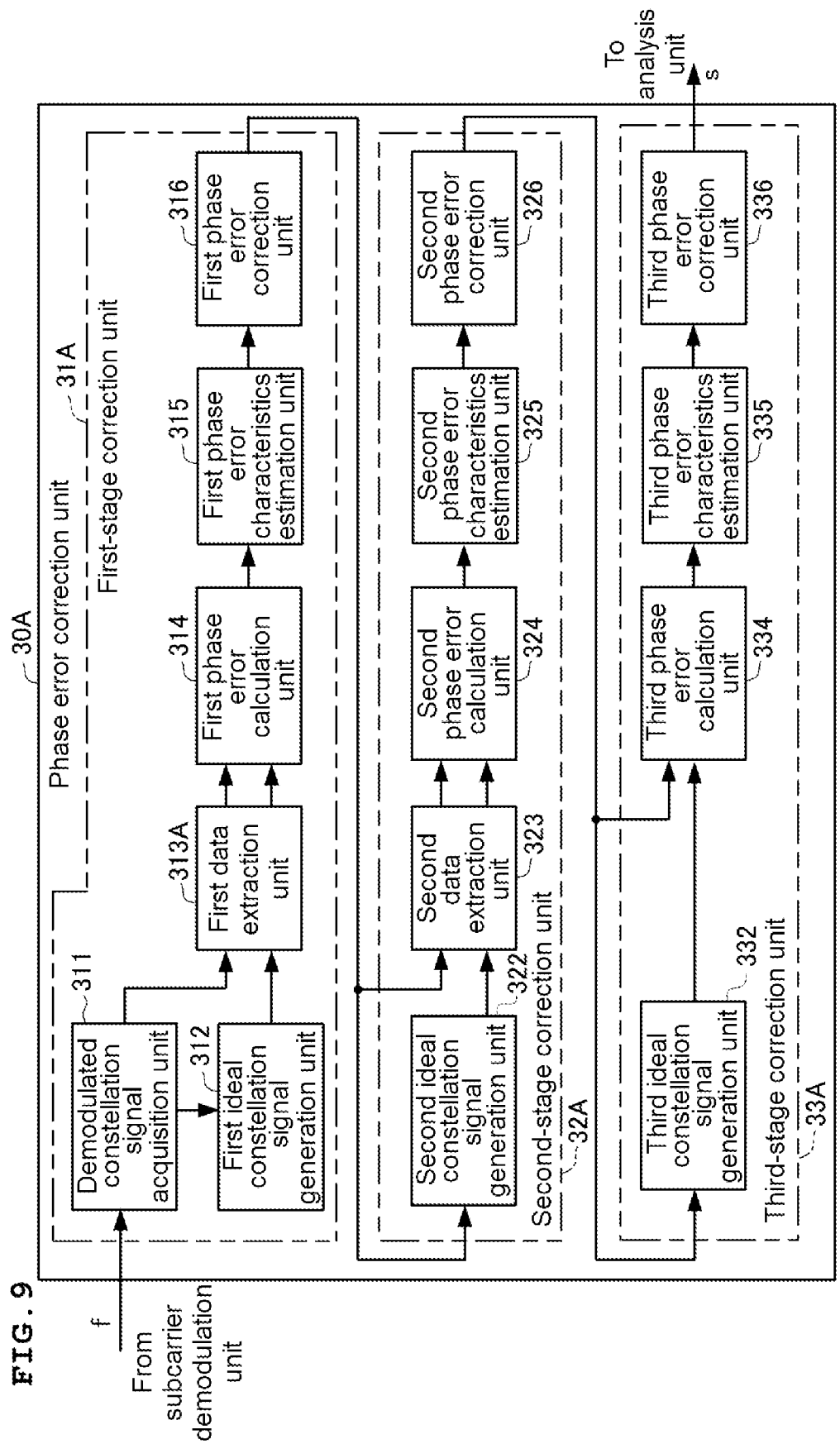
FIG. 9 is a diagram showing a configuration of a phase error detection unit according to a second embodiment.

As shown in FIG. 9, in the receiving device and the mobile terminal test apparatus according to the present embodiment, the configuration of the phase error correction unit 30A is different from the configuration of the phase error correction unit 30 of the first embodiment. Other configurations are the same as the configurations of the first embodiment, the same configurations are designated by the same reference numerals, and detailed description thereof will be omitted as appropriate.

The phase error correction unit 30A according to the present embodiment includes the first-stage correction unit 31A that performs rough correction of the phase error, the second-stage correction unit 32A that performs rough correction of the phase error from a viewpoint different from that of the first-stage correction unit 31A, and the third-stage correction unit 33A that performs the main correction of the phase error. The second-stage correction unit 32A of the present embodiment corresponds to the third correction unit of the present invention.

The first data extraction unit 313A of the first-stage correction unit 31A extracts signal data included in some symbol sections including a known reference symbol, among all symbol sections, from the demodulated constellation signal and the ideal constellation signal.

Figure 10:
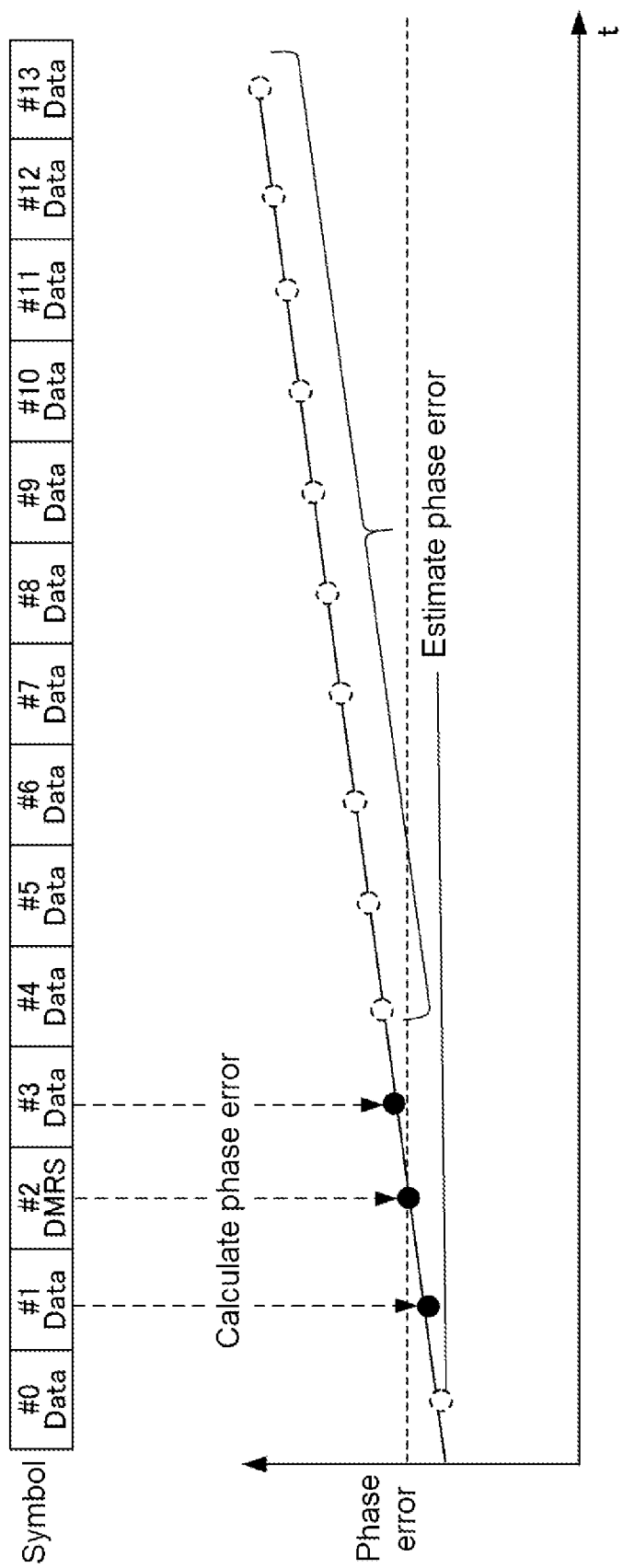
FIG. 10 is a diagram for explaining a method of performing rough correction of a phase error using a reference symbol and symbols before and after the reference symbol.

As shown in FIG. 10, it is assumed that 14 symbols of symbol #0, symbol #1, . . . , and symbol #13 are treated as one block (slot). In this example, symbol #2 is a known DMRS symbol. The first data extraction unit 313A extracts, from the demodulated constellation signal and the ideal constellation signal, the signal data that is present in the sections of the DMRS symbol #2 and the symbol #1 and symbol #3 on both sides thereof, that is, the symbols #1 to #3, among all symbol sections. However, the number of symbols in the symbol section from which the signal data is extracted is not limited to three, and may be two or four or more.

The first phase error calculation unit 314 calculates the phase error of each signal data in the sections of symbols #1 to #3, and calculates the average value of the phase error for each symbol. In FIG. 10, the average phase error in symbol units is plotted.

Specifically, the first phase error calculation unit 314 calculates the average phase error for each symbol by the following equation.

$$\text{Average Phase Error} = \frac{1}{M}\sum_{i=0}^{M-1}\{\arg(DemodConst[i]) - \arg(IdealConst[i])\} \quad (4)$$

Here, M is the total number of subcarriers included in each symbol.

The first phase error characteristics estimation unit 315 estimates an approximate straight line showing the time characteristics of the average phase error, from the average phase error data in the sections of symbols #1 to #3, for example, by the least squares method. The linear approximation formula representing the approximate straight line is interpolated in the sections of other symbols (symbol #0, symbols #4 to #13) to form a linear approximation formula covering all symbol sections (symbol #0 to symbol #13).

The first phase error correction unit 316 corrects the phase error for all the symbol sections by using the linear approximation formula extended to all the symbol sections.

In this way, even when phase rotation occurs, the signal data included in some symbol sections including a predetermined reference symbol such as DMRS is highly reliable data for estimating the characteristics of phase error from other symbols. Therefore, by estimating the time characteristics of the phase error using only such signal data and correcting the phase error based on the characteristics, the phase error of the demodulation signal can be corrected accurately and efficiently. Further, a more accurate ideal constellation signal can be generated in the second-stage correction unit 32A of the next stage.

The second data extraction unit 323 of the second-stage correction unit 32A extracts signal data corresponding to a predetermined ideal constellation point near the origin of the IQ plane, from the demodulated constellation signal and the ideal constellation signal.

Figure 11:
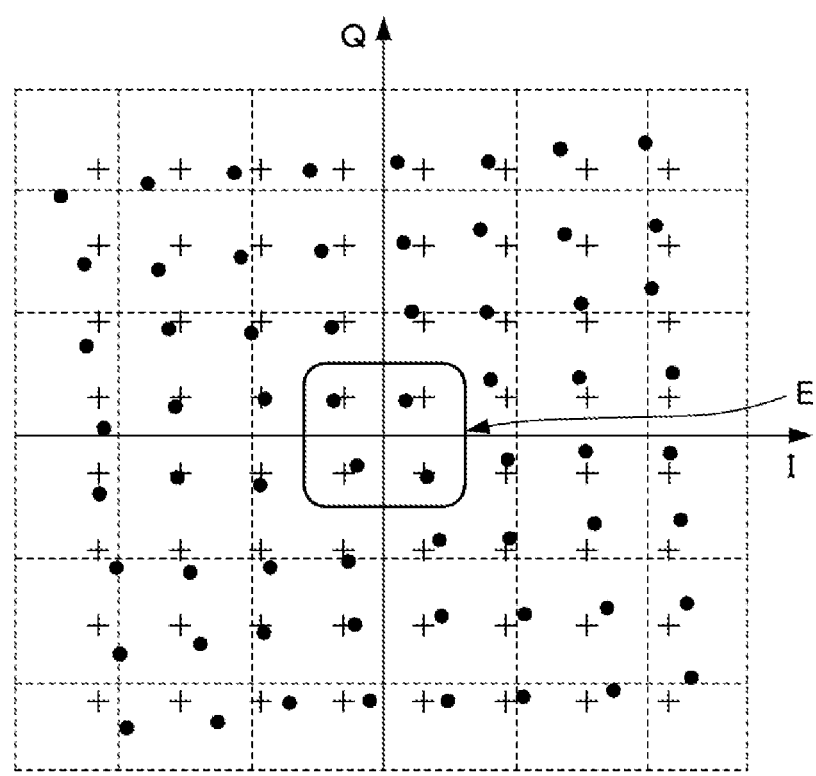
FIG. 11 is a diagram for explaining a method of performing rough correction of a phase error using signal data corresponding to an ideal constellation point near an origin of an IQ plane.

For example, as shown in FIG. 11, the second data extraction unit 323 extracts signal data corresponding to four ideal constellation points closest to the origin of the IQ plane included in the E part in FIG. 11. It is considered that the signal data corresponding to the ideal constellation point near the origin of the IQ plane has a high possibility that the ideal constellation is normal, and is highly reliable in obtaining the frequency characteristics or the time characteristics of the phase error. In the present embodiment, the frequency characteristics or time characteristics of the phase error is estimated by using only the highly reliable signal data corresponding to the ideal constellation point near the origin of the IQ plane, and rough correction of the phase error is performed.

In cases other than QAM, rough correction by the second-stage correction unit 32A may be omitted. Further, even in the case of 16QAM or more, the rough correction may be skipped for the symbols having no constellations in the four places. In the present embodiment, the phase error is calculated using only the subcarriers assigned to the four locations closest to the origin of the IQ plane. However, the ideal constellation points for which signal data is to be extracted are not limited to the 4 points closest to the origin of the IQ plane, and may be more than 4 points such as 12 points or 16 points close to the origin of the IQ plane, or may be less than 4 points.

Figure 12:
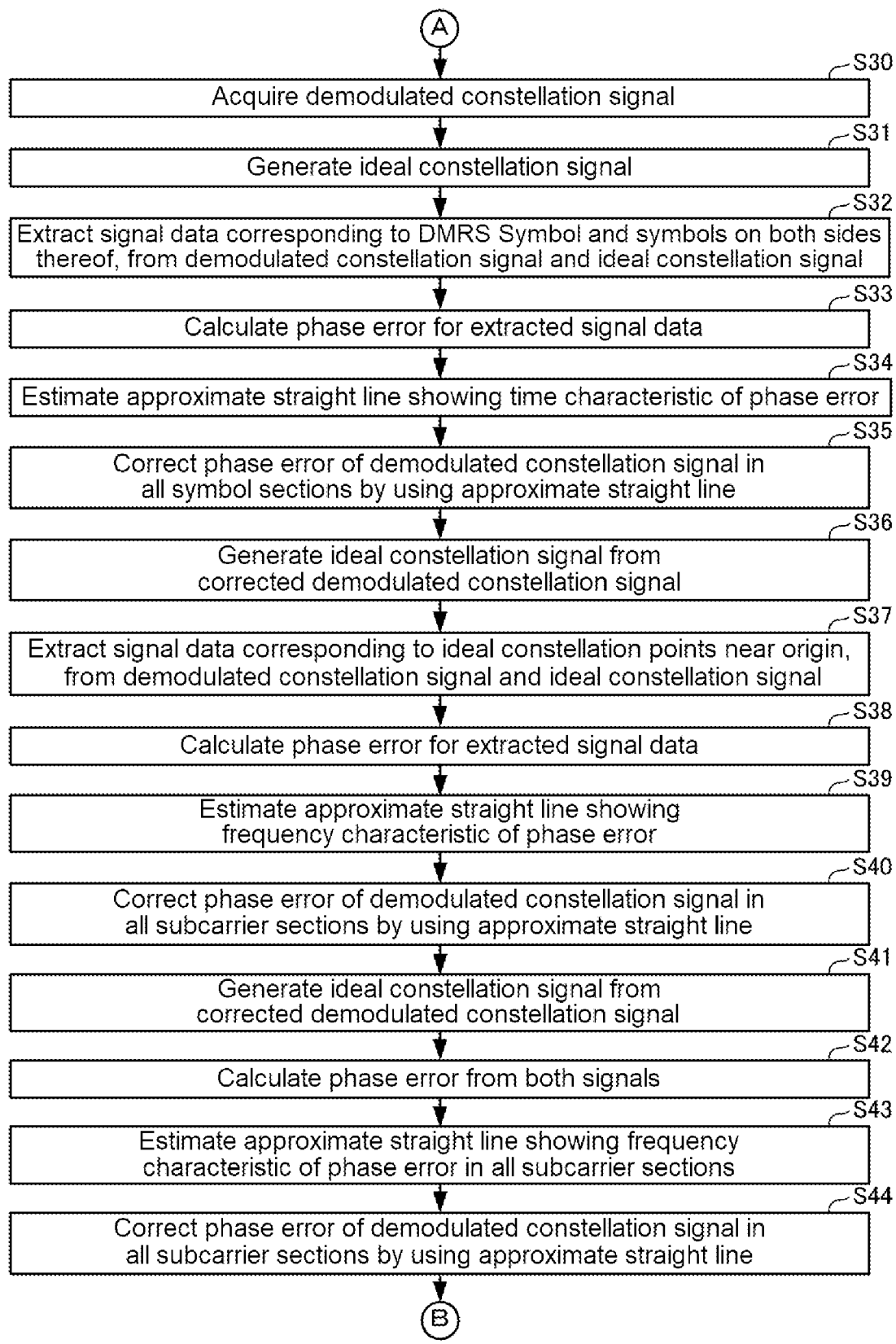
FIG. 12 is a diagram showing a flowchart of a phase error correction method according to the second embodiment.

Next, the phase error correction process will be described with reference to FIG. 12.

In the phase error correction unit 30A, the demodulated constellation signal acquisition unit 311 acquires the OFDM demodulation signal f as a "demodulated constellation signal" from the subcarrier demodulation unit 22 of the demodulation unit 20 and stores it (step S30).

The first ideal constellation signal generation unit 312 generates the ideal constellation signal from the demodulated constellation signal (step S31).

The first data extraction unit 313A extracts signal data corresponding to the DMRS symbol and the symbols on both sides thereof, from the demodulated constellation signal and the ideal constellation signal (step S32).

The first phase error calculation unit 314 calculates the phase error for the signal data extracted from the demodulated constellation signal and the ideal constellation signal (step S33).

The first phase error characteristics estimation unit 315 estimates an approximate straight line indicating the time characteristics of the phase error, from the phase error data of some symbol sections calculated by the first phase error calculation unit 314 (step S34). The approximate straight line is interpolated in the sections outside the some symbol sections to form a linear approximation formula with the all symbol sections as the domain.

The first phase error correction unit 316 corrects the phase error of the demodulated constellation signal in the all symbol sections by using a linear approximation formula representing an approximate straight line estimated by the first phase error characteristics estimation unit 315 (step S35).

Next, the second ideal constellation signal generation unit 322 regenerates the ideal constellation signal from the corrected demodulated constellation signal (step S36).

The second data extraction unit 323 extracts signal data corresponding to the four ideal constellation points near the origin of the IQ plane, from the demodulated constellation signal and the ideal constellation signal (step S37).

The second phase error calculation unit 324 calculates the phase error for the signal data extracted from the demodulated constellation signal and the ideal constellation signal (step S38).

The second phase error characteristics estimation unit 325 estimates an approximate straight line showing the frequency characteristics or time characteristics of the phase error, from the data of the phase error calculated by the second phase error calculation unit 324 (step S39). Paying attention to the relationship between the signal data extracted by the second data extraction unit 323 and the subcarriers of the signal data, the frequency characteristics of the phase error is obtained. Further, paying attention to the relationship between the signal data extracted by the second data extraction unit 323 and the symbol to which the signal data belongs, the time characteristics of the phase error is obtained. The approximate straight line forms a linear approximation formula with the all sections as the domain.

The second phase error correction unit 326 corrects the phase error of the demodulated constellation signal in the all sections, by using the linear approximation formula obtained by the second phase error characteristics estimation unit 325 (step S40).

Next, the third ideal constellation signal generation unit 332 regenerates the ideal constellation signal from the corrected demodulated constellation signal (step S41).

The third phase error calculation unit 334 calculates the phase error from the corrected demodulated constellation signal and the ideal constellation signal in the all sections (step S42).

The third phase error characteristics estimation unit 335 estimates an approximate straight line showing the frequency characteristics of the phase error, from the data of the phase error calculated by the third phase error calculation unit 334 (step S43).

The third phase error correction unit 336 corrects the phase error of the demodulated constellation signal in all sections, by using the approximate straight line obtained by the third phase error characteristics estimation unit 335 (step S44).

The demodulated constellation signal of which phase error has been corrected by the third phase error correction unit 336 is sent to the analysis unit 40 as an OFDM demodulation signal s of which phase error has been corrected.

In this way, even when phase rotation occurs, the signal data corresponding to the four ideal constellation points near the origin of the IQ plane is likely to have normal ideal constellation, and is more reliable in determining the characteristics of the phase error than other constellation points. Therefore, by estimating the frequency characteristics or time characteristics of the phase error using only such signal data and correcting the phase error based on the characteristics, the phase error of the demodulation signal can be corrected accurately and efficiently.

Further, after the first-stage correction unit 31A performs rough correction of the phase error using only the signal data included in some symbol sections including the known reference symbol, the second-stage correction unit 32A performs rough correction of the phase error using only the signal data corresponding to the ideal constellation point near the origin of the IQ plane. In this way, by performing rough correction of the phase error in two steps by different methods, the ideal constellation point can be obtained more accurately, and thereby the phase error of the demodulation signal can be corrected more efficiently and accurately.

In the above description, the first-stage correction unit 31A, which performs rough correction of the phase error, extracts signal data included in some symbol sections including the known reference symbol among the all symbol sections, from the demodulated constellation signal and the ideal constellation signal, but the present invention is not limited to this configuration. The first-stage correction unit 31A may extract signal data corresponding to a predetermined ideal constellation point near the origin of the IQ plane, from the demodulated constellation signal and the ideal constellation signal. In this case, the second-stage correction unit 32A, which performs rough correction of the phase error from a viewpoint different from that of the first-stage correction unit 31A, may extract signal data included in some symbol sections including the known reference symbol among the all symbol sections, from the demodulated constellation signal and the ideal constellation signal.

Further, the phase error correction unit 30A of the present embodiment includes the first-stage correction unit 31A that performs rough correction of the phase error, the second-stage correction unit 32A that performs rough correction of the phase error from a viewpoint different from that of the first-stage correction unit 31A, and the third-stage correction unit 33A that performs the main correction of the phase error, but the present invention is not limited to this configuration. Either one or both of the second-stage correction unit 32A and the third-stage correction unit 33A may be omitted, or either one or both of the first-stage correction unit 31A and the third-stage correction unit 33A may be omitted.

Third Embodiment

Next, a receiving device and a mobile terminal test apparatus according to a third embodiment of the present invention will be described with reference to the drawings.

Figure 13:
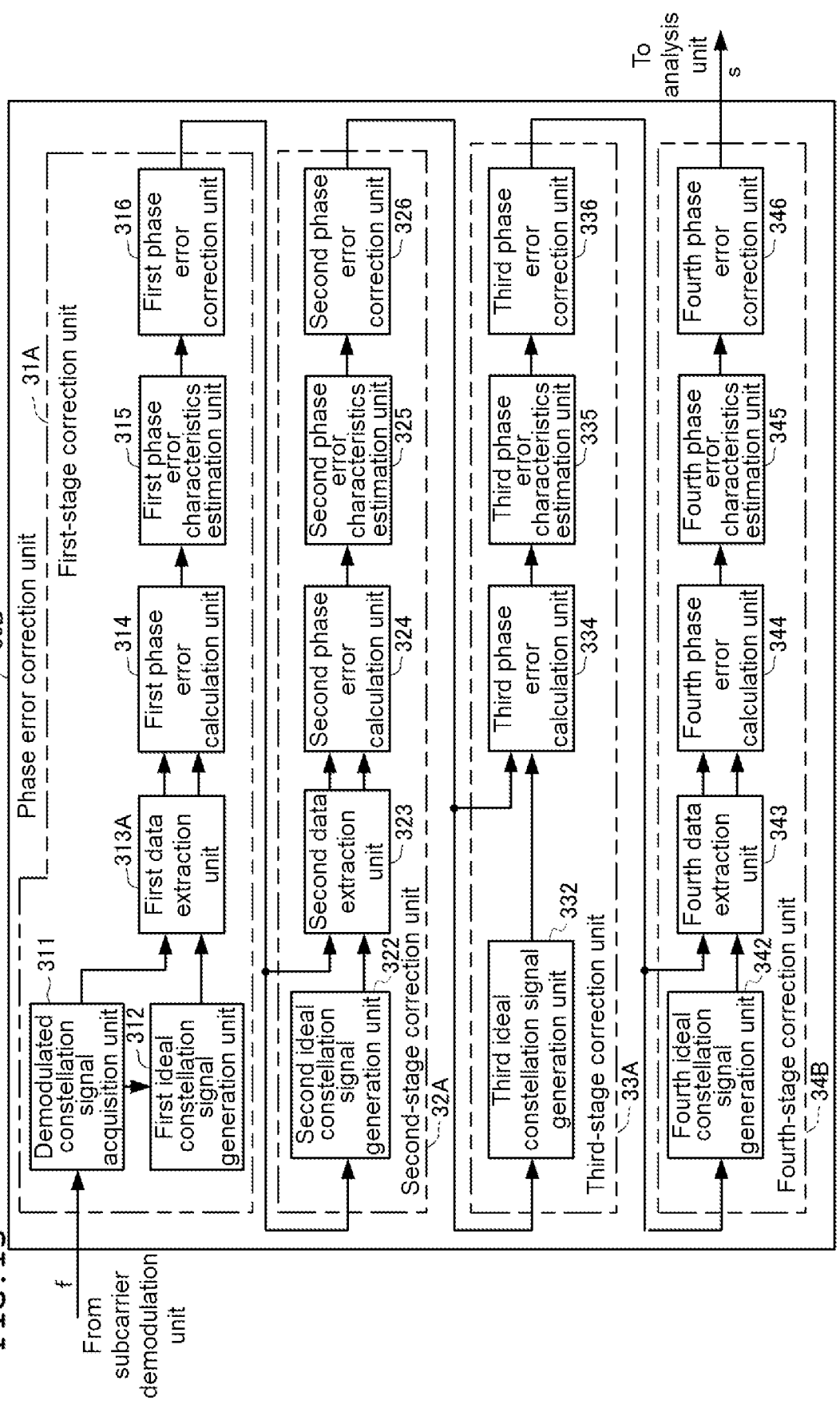
FIG. 13 is a diagram showing a configuration of a phase error detection unit according to a third embodiment.

As shown in FIG. 13, the receiving device and the mobile terminal test apparatus according to the present embodiment are different from the second embodiment in that a fourth-stage correction unit 34B is added to the phase error correction unit 30B. The same configurations as those of the first and second embodiments are designated by the same reference numerals, and detailed description thereof will be omitted as appropriate.

Specifically, the phase error correction unit 30B according to the present embodiment includes the first-stage correction unit 31A that performs rough correction of the phase error, the second-stage correction unit 32A that performs rough correction of the phase error, the third-stage correction unit 33A that performs the main correction of the phase error, and the fourth-stage correction unit 34B that performs rough correction of the phase error from another viewpoint. The third-stage correction unit 33A and the fourth-stage correction unit 34B of the present embodiment correspond to the fourth correction unit and the fifth correction unit of the present invention, respectively.

The fourth-stage correction unit 34B includes a fourth ideal constellation signal generation unit 342, a fourth data extraction unit 343, a fourth phase error calculation unit 344, a fourth phase error characteristics estimation unit 345, and a fourth phase error correction unit 346.

The fourth ideal constellation signal generation unit 342 regenerates the ideal constellation signal from the demodulated constellation signal of which phase error has been corrected by the third-stage correction unit 33A.

A fourth data extraction unit 343 extracts signal data corresponding to a symbol having EVM smaller than the predetermined reference value, from the demodulated constellation signal of which phase error has been corrected by the third phase error correction unit 336 and the ideal constellation signal generated by the fourth ideal constellation signal generation unit 342.

Figure 14A:
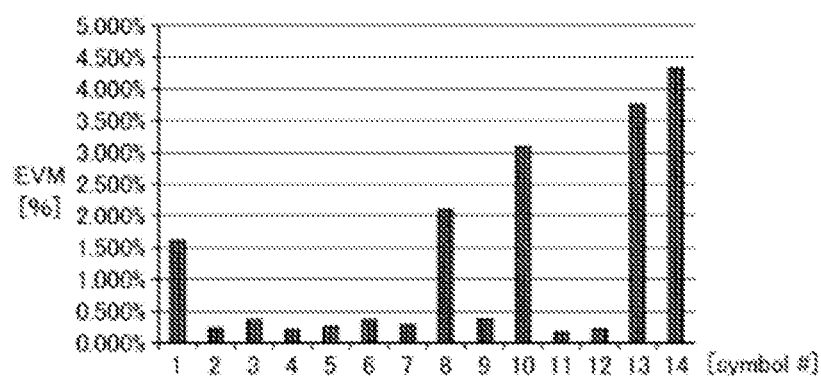
FIGS. 14A to 14C FIGS. 14A to 14C are diagrams for explaining a method of correcting a phase error using signal data corresponding to a symbol having an EVM smaller than a predetermined reference value.

Specifically, the fourth data extraction unit 343 calculates the EVM for each symbol of the acquired demodulated constellation signal. FIG. 14A shows an example of a graph of the calculated EVMs. From FIG. 14A, it can be seen that the EVMs of symbols #1, #8, #10, #13, and #14 are larger than the EVMs of the other symbols, and it is presumed that the phase error correction performed for these symbols is not effective.

Figure 14B:
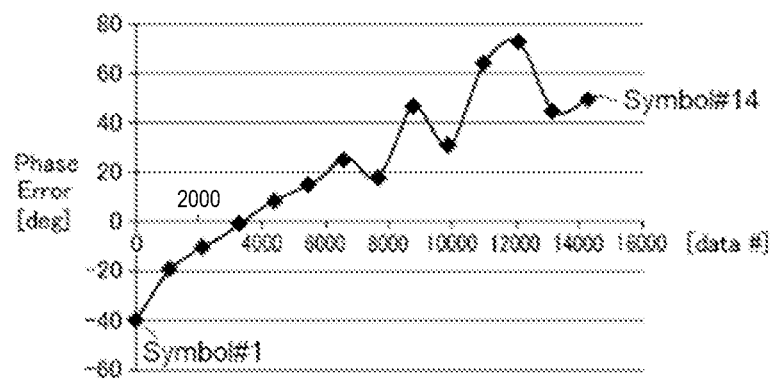

FIG. 14B shows a graph of the phase error of the demodulated constellation signal. It can be seen that the time characteristics of the phase error deviate from the linear tendency at the symbols #1, #8, #10, #13, and #14. When the characteristics of the phase error are estimated using the signal data of these symbols, accurate characteristics may not be acquired.

Therefore, in the present example, for example, 1.0% is set as the reference value of EVM, and the symbols #1, #8, #10, #13, and #14 are excluded. Specifically, the fourth data extraction unit 343 extracts the signal data corresponding to the symbols #2, #3, #4, #5, #6, #7, #9, #11, and #12 having EVMs smaller than the reference value.

Figure 14C:
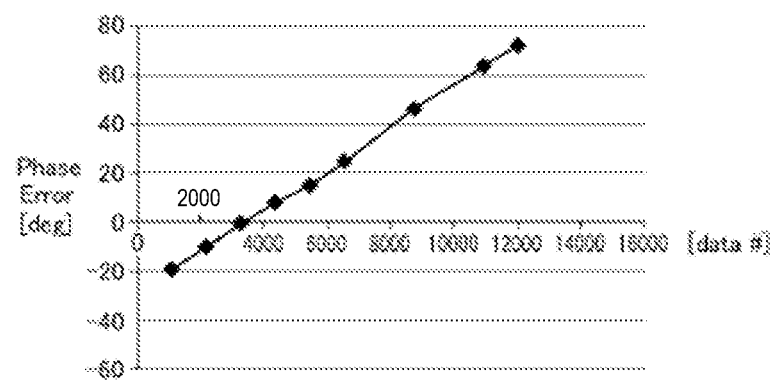

FIG. 14C shows a graph of the phase error when the signal data corresponding to the symbols #2, #3, #4, #5, #6, #7, #9, #11, and #12 are used. Compared with FIG. 14B, the linear time characteristics of the phase error is clear.

The fourth phase error calculation unit 344 calculates the phase error of the demodulated constellation signal with respect to the ideal constellation signal, regarding the signal data extracted by the fourth data extraction unit 343.

The fourth phase error characteristics estimation unit 345 estimates the time characteristics of the phase error based on the calculated phase error.

Figure 15:
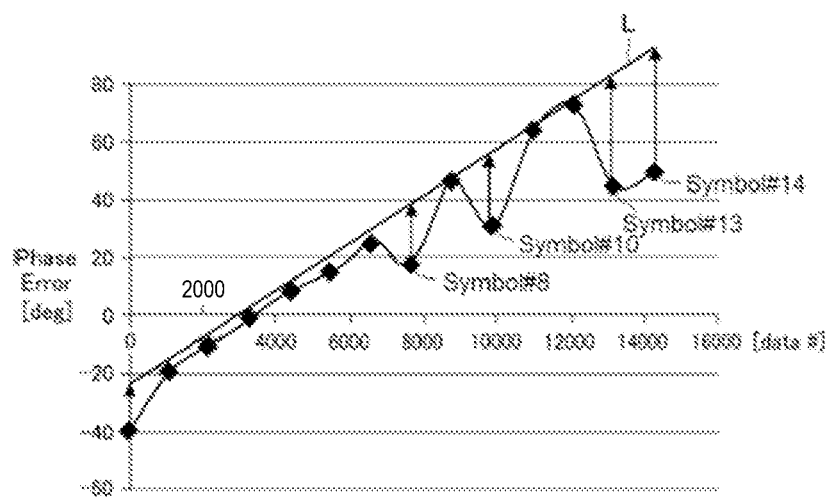
FIG. 15 is a diagram for explaining a method of correcting a phase error using signal data corresponding to a symbol having an EVM smaller than a predetermined reference value.

The fourth phase error correction unit 346 corrects the phase error of the demodulated constellation signal in the all symbol sections for each symbol or each signal data, based on the time characteristics of the phase error. FIG. 15 is a diagram showing a state in which the phase errors of the symbols #1, #8, #10, #13, and #14 are corrected based on the approximate straight line L showing the time characteristics of the phase error. In FIG. 15, the phase error is corrected for the symbols having EVMs larger than the reference value, but the phase error may be corrected based on the straight line L for all the symbols.

Figure 16:
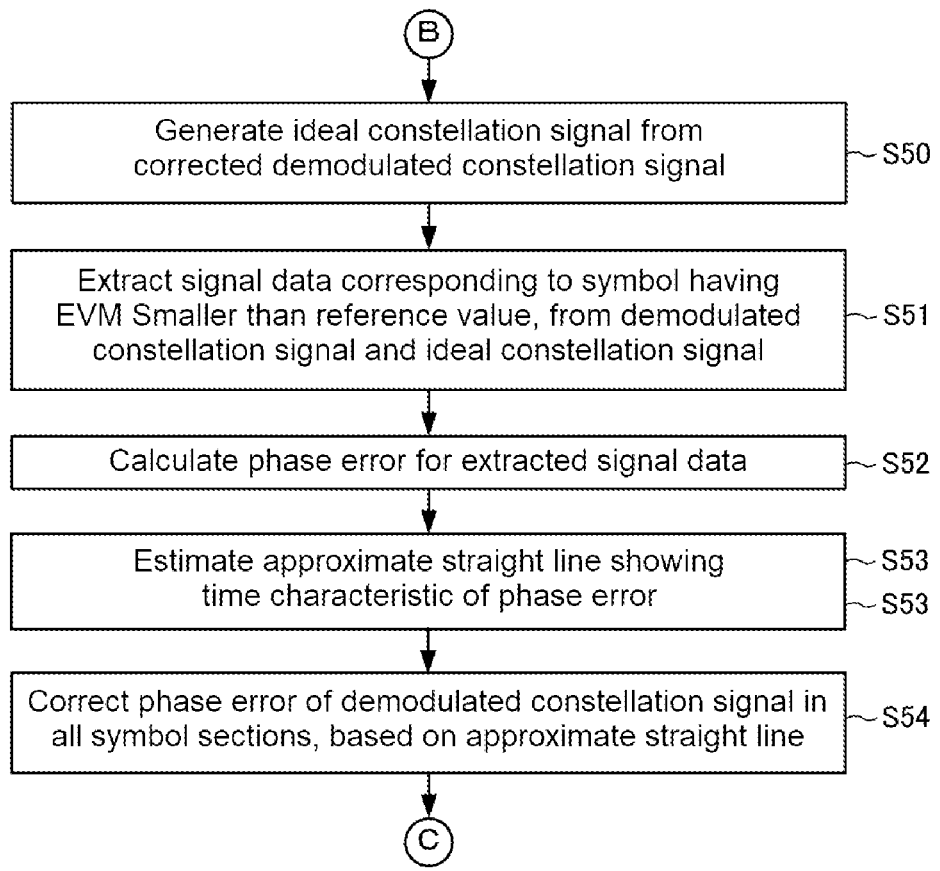
FIG. 16 is a diagram showing a flowchart of a phase error correction method according to the third embodiment.

Next, the phase error correction process will be described with reference to FIG. 16.

It is the same as the second embodiment until the phase error of the demodulated constellation signal is corrected by the third phase error correction unit 336. In the third embodiment, the fourth ideal constellation signal generation unit 342 regenerates the ideal constellation signal from the corrected demodulated constellation signal (step S50).

Next, the fourth data extraction unit 343 calculates the EVM for each symbol, from the corrected demodulated constellation signal and the ideal constellation signal. Then, the fourth data extraction unit 343 extracts signal data corresponding to the symbol having an EVM smaller than the reference value, from the corrected demodulated constellation signal and the ideal constellation signal (step S51).

The fourth phase error calculation unit 344 calculates the phase error with respect to the extracted signal data (step S52). The fourth phase error calculation unit 344 may obtain the average of the phase errors (average phase error) for each symbol.

The fourth phase error characteristics estimation unit 345 obtains the time characteristics of the phase error, from the phase error or the average phase error calculated by the fourth phase error calculation unit 344 (step S53). The time characteristics of the phase error is approximated by a straight line expressed by a linear equation.

Next, the fourth phase error correction unit 346 corrects the phase error of the demodulated constellation signal in all symbol sections for each symbol or each signal data, by using the linear approximation formula obtained by the fourth phase error characteristics estimation unit 345 (step S54). The phase error of the demodulated constellation signal may be corrected for the symbols excluded by the fourth data extraction unit 343.

The demodulated constellation signal of which phase error has been corrected by the fourth phase error correction unit 346 is sent to the analysis unit 40 as an OFDM demodulation signal s of which phase error has been corrected (C).

In this way, after the phase error is corrected by the phase error correction unit 30A according to the second embodiment, the phase error characteristics is obtained by using only the signal data corresponding to the symbol having the EVM smaller than the predetermined reference value, and the rough correction of the phase error is performed. In this way, by performing correction of the phase error in a plurality of steps by different methods, a more accurate ideal constellation signal can be obtained, and thereby the phase error of the demodulation signal can be corrected more accurately. In this way, the abnormality of the phase error can be avoided.

Further, in the third embodiment, a fifth correction unit having the same configuration as the third-stage correction unit 33A may be provided after the fourth-stage correction unit 34B. In this way, after the phase error characteristics are obtained using only highly reliable symbols based on the EVM and the rough correction of the phase error is performed, the phase error characteristics are obtained for the all frequency sections and the main correction of the phase error is performed, so that the phase error can be corrected with high accuracy.

As described above, in the first embodiment, the correction units (1) and (5) below are used, and in the second embodiment, the correction units (2), (3), and (5) below are used, and in the third embodiment, the correction units (2), (3), (5), and (4) below are used.

(1) A first-stage correction unit 31 that obtains phase error characteristics using only the signal data included in some central frequency sections, and applies the characteristics to the all sections to perform rough correction of the phase error, (2) a first-stage correction unit 31A that obtains phase error characteristics using only a known reference symbol and signal data included in the symbols on both sides thereof, and applies the characteristics to the all sections to perform rough correction of the phase error, (3) a second-stage correction unit 32A that obtains phase error characteristics using only signal data corresponding to four ideal constellation points near the origin of an IQ plane, and applies the characteristics to the all sections to perform rough correction of the phase error, (4) a fourth-stage correction unit 34B that obtains phase error characteristics using only signal data corresponding to a symbol having an EVM smaller than a predetermined reference value, and applies the characteristics to the all sections to perform rough correction of the phase error, and (5) a second-stage correction unit 32 that obtains phase error characteristics using signal data of all sections, and applies the characteristics to all sections to perform main correction of the phase error.

However, the present invention is not limited to the combinations described in the above embodiments, and may be configured to include any combination of all or part of the correction units described in (1) to (5) above in any order.

For example, the (2) first-stage correction unit 31A that obtains phase error characteristics using only a known reference symbol and signal data included in the symbols on both sides thereof, and applies the characteristics to the all sections to perform rough correction of the phase error may be used alone or in combination with other correction units. Further, the (3) second-stage correction unit 32A that obtains phase error characteristics using only signal data corresponding to four ideal constellation points near the origin of an IQ plane, and applies the characteristics to the all sections to perform rough correction of the phase error may be used alone or in combination with other correction units. Further, the (4) fourth-stage correction unit 34B that obtains phase error characteristics using only signal data corresponding to a symbol having an EVM smaller than a predetermined reference value, and applies the characteristics to the all sections to perform rough correction of the phase error may be used alone or in combination with other correction units.

As described above, the present invention has an effect of being able to accurately and efficiently correct the phase error of the demodulation signal, and is useful for a receiving device, a receiving method, and a mobile terminal test apparatus provided with the receiving device in general.

DESCRIPTION OF REFERENCE NUMERALS AND SIGNS

1 Mobile terminal test apparatus
2 DUT (mobile communication terminal)
10 Reception unit
11 Down converter
12 ADC
13 Orthogonal demodulation unit
20 Demodulation unit
21 FFT unit
22 Subcarrier demodulation unit
30, 30A, 30B Phase error correction unit
31, 31A First-stage correction unit
311 Demodulated constellation signal acquisition unit
312 First ideal constellation signal generation unit
313 Data extraction unit
313A First data extraction unit
314 First phase error calculation unit
315 First phase error characteristics estimation unit
316 First phase error correction unit
32 Second-stage correction unit (second correction unit)
32A Second-stage correction unit (third correction unit)
322 Second ideal constellation signal generation unit
323 Second data extraction unit
324 Second phase error calculation unit
325 Second phase error characteristics estimation unit
326 Second phase error correction unit
33A Third-stage correction unit (fourth correction unit)
332 Third ideal constellation signal generation unit
334 Third phase error calculation unit
335 Third phase error characteristics estimation unit
336 Third phase error correction unit
34B Fourth-stage correction unit (fifth correction unit)
342 Fourth ideal constellation signal generation unit
343 Fourth data extraction unit
344 Fourth phase error calculation unit
345 Fourth phase error characteristics estimation unit
346 Fourth phase error correction unit
40 Analysis unit
50 Display unit
60 Control unit
70 Operation unit
100 Receiving device
a Modulated signal
b Intermediate frequency signal
c Digital intermediate frequency signal
d Orthogonal demodulation signal
e Frequency domain signal
f OFDM demodulation signal (demodulated constellation signal, demodulation signal)
s OFDM demodulation signal with corrected phase error

What is claimed is:

1. A receiving device comprising:
a reception unit that receives a modulation signal modulated by an orthogonal frequency division multiplexing (OFDM) method from a mobile communication terminal;
a demodulation unit that demodulates the received modulation signal to acquire a demodulated constellation signal;
an ideal constellation signal generation unit that generates an ideal constellation signal from the demodulated constellation signal;
a data extraction unit that selects and extracts a part of signal data, from the demodulated constellation signal and the ideal constellation signal;
a phase error calculation unit that calculates a phase error of the demodulated constellation signal with respect to the ideal constellation signal, regarding the extracted signal data;
a phase error characteristics estimation unit that estimates frequency characteristics or time characteristics of the phase error, based on the calculated phase error; and
a phase error correction unit that corrects the phase error of the demodulated constellation signal, based on the estimated frequency characteristics or time characteristics of the phase error, wherein
the data extraction unit extracts signal data included in some symbol sections including a known reference symbol, among all symbol sections, from the demodulated constellation signal and the ideal constellation signal.

2. The receiving device according to claim 1, further comprising:
a second correction unit that calculates a phase error between the demodulated constellation signal of which the phase error has been corrected by the phase error correction unit and the ideal constellation signal which is regenerated from the demodulated constellation signal of which the phase error has been corrected, estimates the frequency characteristics or time characteristics of the phase error, based on the calculated phase error, and corrects the phase error of the demodulated constellation signal, based on the estimated frequency characteristics or time characteristics of the phase error.

3. The receiving device according to claim 1, further comprising:
a third correction unit that extracts signal data corresponding to a predetermined ideal constellation point near an origin of an IQ plane, from the demodulated constellation signal of which the phase error has been corrected by the phase error correction unit and the ideal constellation signal which is regenerated from the demodulated constellation signal of which the phase error has been corrected, calculates a phase error of the demodulated constellation signal with respect to the ideal constellation signal, regarding the extracted signal data, estimates the frequency characteristics or time characteristics of the phase error, based on the calculated phase error, and corrects the phase error of the demodulated constellation signal, based on the estimated frequency characteristics or time characteristics of the phase error.

4. The receiving device according to claim 3, further comprising:
a fourth correction unit that calculates a phase error between the demodulated constellation signal of which the phase error has been corrected by the third correction unit and the ideal constellation signal which is regenerated from the demodulated constellation signal of which the phase error has been corrected, estimates the frequency characteristics or time characteristics of the phase error, based on the calculated phase error, and corrects the phase error of the demodulated constellation signal, based on the estimated frequency characteristics or time characteristics of the phase error; and
a fifth correction unit that extracts signal data corresponding to a symbol having EVM smaller than a predetermined reference value, from the demodulated constellation signal of which the phase error has been corrected by the fourth correction unit and the ideal constellation signal regenerated from the demodulated constellation signal of which the phase error has been corrected, calculates a phase error of the demodulated constellation signal with respect to the ideal constellation signal, regarding the extracted signal data, estimates the frequency characteristics or time characteristics of the phase error, based on the calculated phase error, and corrects the phase error of the demodulated constellation signal, based on the estimated frequency characteristics or time characteristics of the phase error.

5. A receiving device comprising:
a reception unit that receives a modulation signal modulated by an orthogonal frequency division multiplexing (OFDM) method from a mobile communication terminal;
a demodulation unit that demodulates the received modulation signal to acquire a demodulated constellation signal;
an ideal constellation signal generation unit that generates an ideal constellation signal from the demodulated constellation signal;
a data extraction unit that selects and extracts a part of signal data, from the demodulated constellation signal and the ideal constellation signal;
a phase error calculation unit that calculates a phase error of the demodulated constellation signal with respect to the ideal constellation signal, regarding the extracted signal data;
a phase error characteristics estimation unit that estimates frequency characteristics or time characteristics of the phase error, based on the calculated phase error; and
a phase error correction unit that corrects the phase error of the demodulated constellation signal, based on the estimated frequency characteristics or time characteristics of the phase error, wherein
the data extraction unit extracts signal data corresponding to a predetermined ideal constellation point near an origin of an IQ plane, from the demodulated constellation signal and the ideal constellation signal.

6. The receiving device according to claim 5, further comprising:
a second correction unit that calculates a phase error between the demodulated constellation signal of which the phase error has been corrected by the phase error correction unit and the ideal constellation signal which is regenerated from the demodulated constellation signal of which the phase error has been corrected, estimates the frequency characteristics or time characteristics of the phase error, based on the calculated phase error, and corrects the phase error of the demodulated constellation signal, based on the estimated frequency characteristics or time characteristics of the phase error.

7. A receiving device comprising:
a reception unit that receives a modulation signal modulated by an orthogonal frequency division multiplexing (OFDM) method from a mobile communication terminal;
a demodulation unit that demodulates the received modulation signal to acquire a demodulated constellation signal;
an ideal constellation signal generation unit that generates an ideal constellation signal from the demodulated constellation signal;
a data extraction unit that selects and extracts a part of signal data, from the demodulated constellation signal and the ideal constellation signal;
a phase error calculation unit that calculates a phase error of the demodulated constellation signal with respect to the ideal constellation signal, regarding the extracted signal data;
a phase error characteristics estimation unit that estimates frequency characteristics or time characteristics of the phase error, based on the calculated phase error; and
a phase error correction unit that corrects the phase error of the demodulated constellation signal, based on the estimated frequency characteristics or time characteristics of the phase error, wherein
the data extraction unit extracts signal data corresponding to a symbol having an error vector magnitude (EVM) smaller than a predetermined reference value, from the demodulated constellation signal and the ideal constellation signal.

8. The receiving device according to claim 7, further comprising:
a second correction unit that calculates a phase error between the demodulated constellation signal of which the phase error has been corrected by the phase error correction unit and the ideal constellation signal which is regenerated from the demodulated constellation signal of which the phase error has been corrected, estimates the frequency characteristics or time characteristics of the phase error, based on the calculated phase error, and corrects the phase error of the demodulated constellation signal, based on the estimated frequency characteristics or time characteristics of the phase error.

* * * * *